US012181817B2

(12) United States Patent
Minoshima et al.

(10) Patent No.: US 12,181,817 B2
(45) Date of Patent: Dec. 31, 2024

(54) IMAGE FORMING APPARATUS

(71) Applicant: BROTHER KOGYO KABUSHIKI KAISHA, Nagoya (JP)

(72) Inventors: Saya Minoshima, Gifu (JP); Soma Nagaya, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/473,404

(22) Filed: Sep. 25, 2023

(65) Prior Publication Data

US 2024/0111237 A1 Apr. 4, 2024

(30) Foreign Application Priority Data

Sep. 30, 2022 (JP) ................................ 2022-158845

(51) Int. Cl.
*G03G 15/20* (2006.01)
*G03G 15/00* (2006.01)

(52) U.S. Cl.
CPC ..... *G03G 15/2028* (2013.01); *G03G 15/5008* (2013.01); *G03G 15/505* (2013.01); *G03G 15/6529* (2013.01); *G03G 15/6555* (2013.01); *G03G 15/657* (2013.01); *G03G 2215/00075* (2013.01); *G03G 2215/00413* (2013.01); *G03G 2215/00556* (2013.01); *G03G 2215/00573* (2013.01); *G03G 2215/00599* (2013.01)

(58) Field of Classification Search
CPC ........... G03G 15/2028; G03G 15/5008; G03G 15/505; G03G 15/6555; G03G 15/657; G03G 15/6529; G03G 2215/00075; G03G 2215/00413; G03G 2215/00556; G03G 2215/00573; G03G 2215/00599
See application file for complete search history.

(56) References Cited

U.S. PATENT DOCUMENTS

2013/0243508 A1* 9/2013 Mori .................. G03G 15/2028 399/400
2022/0334520 A1* 10/2022 Nishi ................. G03G 15/2028

FOREIGN PATENT DOCUMENTS

JP 10-48982 A 2/1998

* cited by examiner

*Primary Examiner* — Joseph S Wong
(74) *Attorney, Agent, or Firm* — Merchant & Gould P.C.

(57) ABSTRACT

A reciprocating mechanism reciprocates by drive force from a drive source and to press a chute to move from a first position to a second position. In response to determining that a parameter is greater than a threshold for the parameter, a controller executes a first mode of actuating the drive source when conveying one sheet. The parameter decreases as a conveyance speed of the sheet at the fixing nip increases. The threshold is such a value that, when the parameter is greater than the threshold, a difference between a conveyance speed of the sheet at a transfer nip and the conveyance speed of the sheet at the fixing nip is greater than a particular level. In response to determining that the parameter is smaller than or equal to the threshold, the controller executes a second mode of not actuating the drive source when conveying one sheet.

21 Claims, 12 Drawing Sheets

IMAGE FORMING APPARATUS

REFERENCE TO RELATED APPLICATIONS

This application claims priority from Japanese Patent Application No. 2022-158845 filed on Sep. 30, 2022. The entire content of the priority application is incorporated herein by reference.

BACKGROUND ART

An image forming apparatus that forms an image and fixes the image on a sheet is known.

DESCRIPTION

An image forming apparatus includes a fuser (fixing device), a conveyance guide for directing a sheet material toward the fuser, a spring, and a cam. The conveyance guide moves to a first operating position which is a normal position, a second operating position which is rotated slightly downward from the first operating position, and a third operating position which is rotated further downward. The conveyance guide is pulled from the first operating position toward the third operating position by the spring. The cam is arranged below the conveyance guide. The conveyance guide moves between the first operating position, the second operating position, and the third operating position by rotation of the cam.

In the above image forming apparatus, first, each time a sheet material is printed, at the timing when the sheet material enters a transfer nip, the cam is rotated to move the conveyance guide from the first operating position to the second operating position. Subsequently, in accordance with development of a loop of the sheet material, the cam is further rotated to move the conveyance guide from the second operating position to the third operating position. Subsequently, after the sheet material has passed through the conveyance guide, the cam is further rotated to return the conveyance guide from the third operating position to the first operating position.

Thus, it is necessary to rotate the cam with a driving device each time printing is performed on one sheet material, which makes it difficult to suppress an increase in power consumption.

In view of the foregoing, an example of an object of this disclosure is to provide an image forming apparatus configured to stably convey a sheet between a transfer nip and a fixing nip while suppressing an increase in power consumption.

According to one aspect, this specification discloses an image forming apparatus. The image forming apparatus includes a photosensitive drum, a development device, a transfer roller, a fuser, a chute, a pressing member, a drive source, a reciprocating mechanism, and a controller. The photosensitive drum is rotatable about an axis extending in a first direction. The development device is configured to supply toner to the photosensitive drum. The transfer roller is configured to transfer toner on the photosensitive drum to a sheet. The transfer roller is located on one side of the photosensitive drum in a second direction crossing the first direction. The transfer roller is configured to contact the photosensitive drum. The fuser is configured to fix toner on the sheet. The fuser includes a heater configured to heat the sheet and a pressure roller configured to press the sheet. The chute is located between the transfer roller and the fuser in a third direction crossing both the first direction and the second direction. The chute causes the sheet having passed through a transfer nip to be directed toward a fixing nip. The transfer nip is a nip between the photosensitive drum and the transfer roller. The fixing nip is a nip between the heater and the pressure roller. The chute is movable in the second direction between a first position and a second position shifted from the first position toward the one side in the second direction. The chute located at the second position is farther away from an imaginary plane than the chute located at the first position. The imaginary plane passes through the transfer nip and the fixing nip. The pressing member is configured to press the chute from the second position toward the first position. The reciprocating mechanism is configured to reciprocate by drive force from the drive source and to press the chute to move from the first position to the second position against pressing force of the pressing member. The controller is configured to: in response to determining that a parameter is greater than a threshold for the parameter, execute a first mode of actuating the drive source when conveying one sheet. The parameter decreases as a conveyance speed of the sheet at the fixing nip increases. The threshold is such a value that, when the parameter is greater than the threshold, a difference between a conveyance speed of the sheet at the transfer nip and the conveyance speed of the sheet at the fixing nip is greater than a particular level. Thus, when the conveyance speed of the sheet at the fixing nip is slow, the chute is located at the second position to allow the sheet to bend. As a result, the sheet is stably conveyed between the transfer nip and the fixing nip. The controller is configured to: in response to determining that the parameter is smaller than or equal to the threshold, execute a second mode of not actuating the drive source when conveying one sheet. Thus, when the conveyance speed of the sheet at the fixing nip increases, the chute is located at the first position to stably convey the sheet between the transfer nip and the fixing nip, without consuming power for actuating the drive source. As a result, the sheet is stably conveyed between the transfer nip and the fixing nip while suppressing an increase in power consumption.

According to another aspect, the controller is configured to: in response to determining that a parameter is smaller than a threshold for the parameter, execute a first mode of actuating the drive source when conveying one sheet. The parameter increases as a conveyance speed of the sheet at the fixing nip increases. The threshold is such a value that, when the parameter is smaller than the threshold, a difference between a conveyance speed of the sheet at the transfer nip and the conveyance speed of the sheet at the fixing nip is greater than a particular level. Thus, when the conveyance speed of the sheet at the fixing nip is slow, the chute is located at the second position to allow the sheet to bend. As a result, the sheet is stably conveyed between the transfer nip and the fixing nip. The controller is configured to: in response to determining that the parameter is greater than or equal to the threshold, execute a second mode of not actuating the drive source when conveying one sheet. Thus, when the conveyance speed of the sheet at the fixing nip increases, the chute is located at the first position to stably convey the sheet between the transfer nip and the fixing nip, without consuming power for actuating the drive source. As a result, the sheet is stably conveyed between the transfer nip and the fixing nip while suppressing an increase in power consumption.

1. OVERVIEW OF IMAGE FORMING APPARATUS 1

Figure 1:
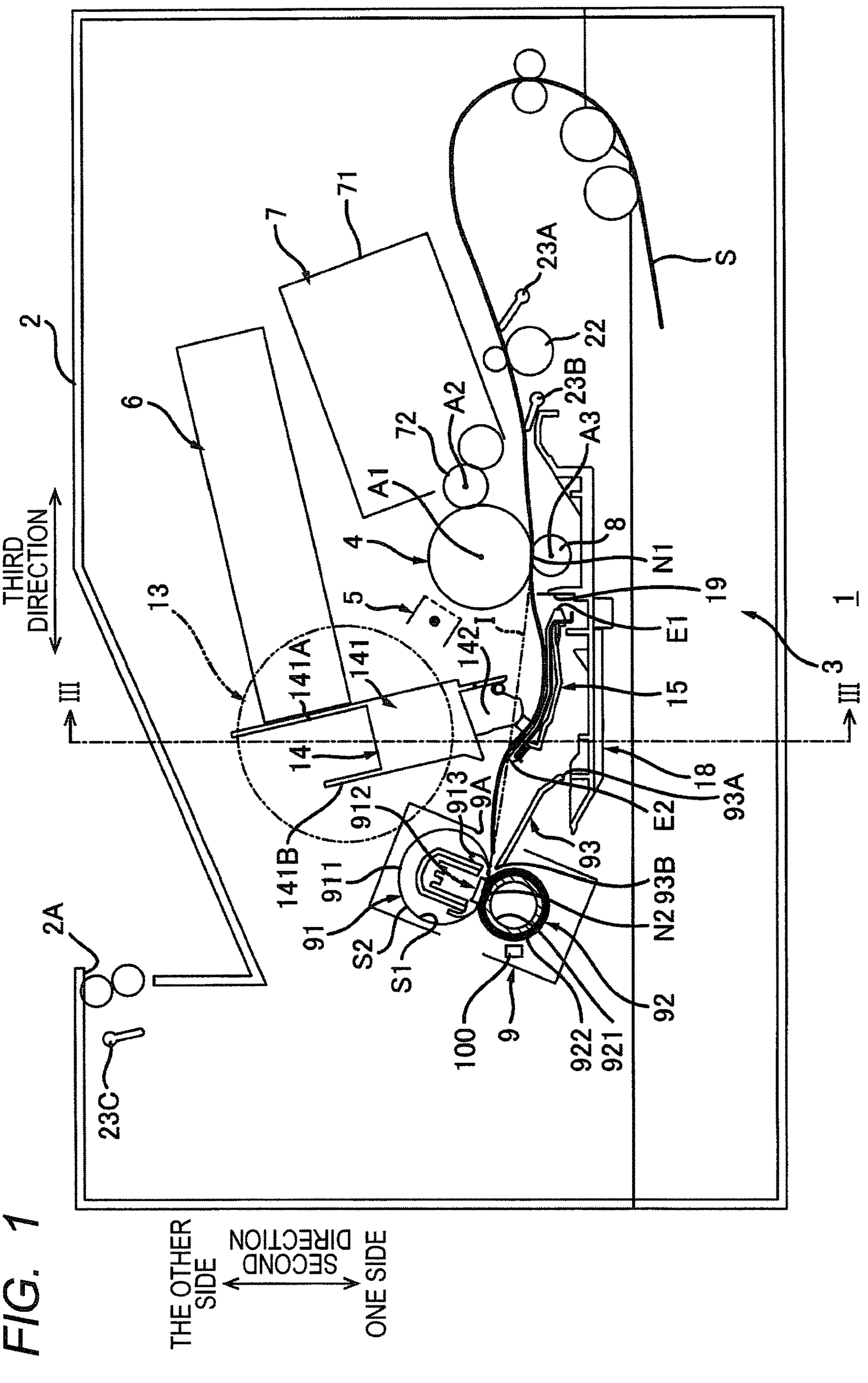
FIG. 1 is a schematic configuration diagram of an image forming apparatus.

An image forming apparatus 1 includes a main housing 2, a sheet storage portion 3, a photosensitive drum 4, a charger 5, an exposure device 6, a development device 7, a transfer roller 8, and a fuser (fixing device) 9.

1.1 Main Housing 2

The main housing 2 accommodates the sheet storage portion 3, the photosensitive drum 4, the charger 5, the exposure device 6, the development device 7, the transfer roller 8, and the fuser 9.

1.2 Sheet Storage Portion 3

The sheet storage portion 3 is configured to store sheets S therein. The sheet S is, for example, printing paper. The sheet S in the sheet storage portion 3 is conveyed toward the photosensitive drum 4.

1.3 Photosensitive Drum 4

The photosensitive drum 4 extends in a first direction. The photosensitive drum 4 has a cylindrical shape. The photosensitive drum 4 is rotatable about an axis A1. The axis A1 extends in the first direction.

1.4 Charger 5

The charger 5 charges a circumferential surface of the photosensitive drum 4. In this embodiment, the charger 5 is a scorotron charger. The charger 5 may be a charging roller.

1.5 Exposure Device 6

The exposure device 6 exposes the circumferential surface of the photosensitive drum 4 charged by the charger 5. The exposure device 6 is specifically a laser scan unit. The exposure device 6 may be an LED array.

1.6 Development Device 7

The development device 7 supplies toner to the circumferential surface of the photosensitive drum 4. Specifically, the development device 7 supplies toner to the circumferential surface of the photosensitive drum 4 exposed by the exposure device 6. The development device 7 includes a development housing 71 and a development roller 72.

1.6.1 Development Housing 71

The development housing 71 is configured to contain toner.

1.6.2 Development Roller 72

The development roller 72 is configured to supply the toner in the development housing 71 to the circumferential surface of the photosensitive drum 4. The development roller 72 contacts the photosensitive drum 4. The development roller 72 extends in the first direction. The development roller 72 has a cylindrical shape. The development roller 72 is rotatable about an axis A2. The axis A2 extends in the first direction.

1.7 Transfer Roller 8

The transfer roller 8 transfers the toner on the circumferential surface of the photosensitive drum 4 onto the sheet S. The transfer roller 8 is located on one side of the photosensitive drum 4 in a second direction. The second direction crosses the first direction. The transfer roller 8 contacts the photosensitive drum 4. The sheet S in the sheet storage portion 3 is conveyed to the fuser 9 through a transfer nip N1. The transfer nip N1 is a nip between the photosensitive drum 4 and the transfer roller 8. The transfer roller 8 transfers the toner on the circumferential surface of the photosensitive drum 4 onto the sheet S passing through the transfer nip N1. The transfer roller 8 extends in the first direction. The transfer roller 8 has a cylindrical shape. The transfer roller 8 is rotatable about an axis A3. The axis A3 extends in the first direction.

1.8 Fuser 9

Figure 2:
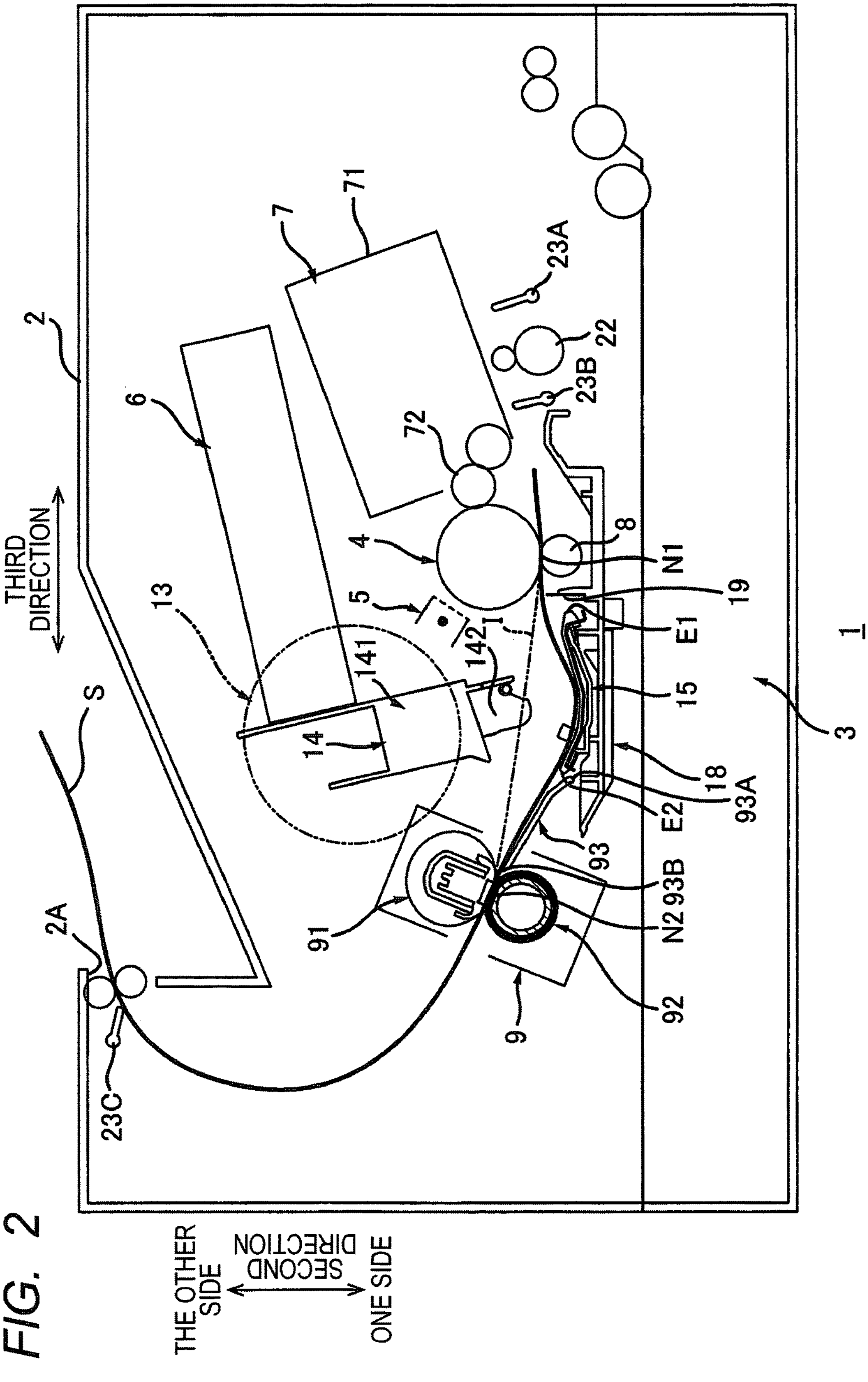
FIG. 2 shows a state where a chute shown in FIG. 1 is located at a second position.

The fuser 9 is located away from the transfer roller 8 in a third direction. The third direction crosses both the first direction and the second direction. The fuser 9 heats and presses the sheet S on which the toner has been transferred, thereby fixing the toner onto the sheet S. As shown in FIG. 2, the sheet S that has passed through the fuser 9 is discharged to the upper surface of the main housing 2 through a discharge port 2A of the main housing 2. That is, the main housing 2 has the discharge port 2A. The discharge port 2A discharges the sheet S that has passed through the fuser 9.

2. DETAILS OF FUSER 9

Next, details of the fuser 9 will be described.

As shown in FIG. 1, the fuser 9 includes a heating unit 91, a pressure roller 92, and a fixing guide 93.

2.1 Heating Unit 91

The heating unit 91 heats the sheet S on which toner has been transferred. The heating unit 91 includes a belt 911, a heater 912, and a holder 913.

2.1.1 Belt 911

The belt 911 heats the sheet S on which the toner has been transferred. The belt 911 is tubular. The belt 911 extends in the first direction. The belt 911 is movable with respect to the heater 912. The belt 911 is rotatable around the holder 913. The belt 911 has an inner surface S1 and an outer surface S2.

2.1.2 Heater 912

The heater 912 heats the belt 911. The heater 912 is located inside the belt 911. The heater 912 contacts the inner surface S1 of the belt 911. The heater 912 is plate-shaped. The heater 912 extends in the first direction. Specifically, the heater 912 has a base board and a heating element. The base board is made of metal such as stainless steel, for example. The surface of the base board is covered with an insulating layer. The heating element is located on the insulating layer of the base board. The heating element generates heat when energized. The heating element is a resistance heating element. The heating element is made of, for example, a silver-palladium alloy.

2.1.3 Holder 913

The holder 913 is located inside the belt 911. The holder 913 supports the heater 912. The holder 913 is made of resin.

2.2 Pressure Roller 92

The pressure roller 92 contacts the outer surface S2 of the belt 911. The pressure roller 92 presses the sheet S passing through a fixing nip N2 toward the heater 912. The fixing nip N2 is a nip between the belt 911 of the heating unit 91 and the pressure roller 92. The fixing nip N2 is located on the other side of the transfer nip N1 in the second direction. The pressure roller 92 rotates by receiving power from a motor (not shown) inside the main housing 2. The belt 911 of the heating unit 91 rotates by following rotation of the pressure roller 92. The pressure roller 92 is a rubber roller. Specifically, the pressure roller 92 includes a roller core 921 and a rubber layer 922.

The roller core 921 extends in the first direction. The roller core 921 has a cylindrical shape. The roller core 921 is made of metal.

The rubber layer 922 is located on the circumferential surface of the roller core 921. The rubber layer 922 covers the circumferential surface of the roller core 921. The rubber layer 922 extends in the first direction and in the circumferential direction of the roller core 921.

2.3 Fixing Guide 93

The fixing guide 93 guides the sheet S entering the fixing nip N2 to the fixing nip N2. The fixing guide 93 extends in the third direction. The fixing guide 93 is inclined with respect to an imaginary plane I passing through the transfer nip N1 and the fixing nip N2. The fixing guide 93 has one end 93A and an other end 93B in the third direction. The other end 93B is located between the one end 93A and the fixing nip N2 in the third direction. The fixing guide 93 approaches the imaginary plane I from the one end 93A toward the other end 93B in the third direction.

3. DETAILS OF IMAGE FORMING APPARATUS 1

Next, details of the image forming apparatus 1 will be described with reference to FIGS. 1 to 8.

In the image forming apparatus 1, the conveyance speed of the sheet S in the fuser 9 is set slower than the conveyance speed of the sheet S by the photosensitive drum 4 and the transfer roller 8. This is to prevent the fuser 9 from pulling the sheet S passing through the transfer nip N1 in a state where the sheet S is nipped both at the transfer nip N1 and the fixing nip N2 (see FIG. 2).

In particular, in a case where a rubber roller is employed as the pressure roller 92 as in the fuser 9 of this embodiment, the rubber layer 922 is heated by the heating unit 91 and the rubber layer 922 expands, and the circumferential speed of the pressure roller 92 may increase. If the circumferential speed of the pressure roller 92 increases, the conveyance speed of the sheet S in the fuser 9 increases. For this reason, the conveyance speed of the sheet S in the fuser 9 is set even slower than the conveyance speed of the sheet S by the photosensitive drum 4 and transfer roller 8, so that the fuser 9 does not pull the sheet S passing through the transfer nip N1 even when the conveyance speed of the sheet S in the fuser 9 increases.

Thus, as shown in FIG. 2, in a state where the sheet S is nipped both at the transfer nip N1 and the fixing nip N2, the sheet S between the transfer nip N1 and the fixing nip N2 may bend greatly and separate from the imaginary plane I passing through the transfer nip N1 and the fixing nip N2.

Here, in a case where a chute is fixed away from the imaginary plane I so as to allow the bending of the sheet S, the chute is separated from the imaginary plane I. Thus, the chute cannot support the sheet S before the leading edge of the sheet S enters the fixing nip N2.

Then, there is a possibility that a failure occurs such as the sheet S being jammed between the transfer nip N1 and the fixing nip N2 before the leading edge of the sheet S enters the fixing nip N2.

In this regard, in the image forming apparatus 1, as shown in FIGS. 1 and 2, a chute 15 is movable between a first position (see FIG. 1) and a second position (see FIG. 2).

As shown in FIG. 1, in a state where the chute 15 is located at the first position, the chute 15 supports the sheet S before the leading edge of the sheet S enters the fixing nip N2. As shown in FIG. 2, in a state where the chute 15 is located at the second position, the chute 15 allows the bending of the sheet S that has entered the fixing nip N2 and has not passed the transfer nip N1. A detailed description will be given below.

Figure 3:
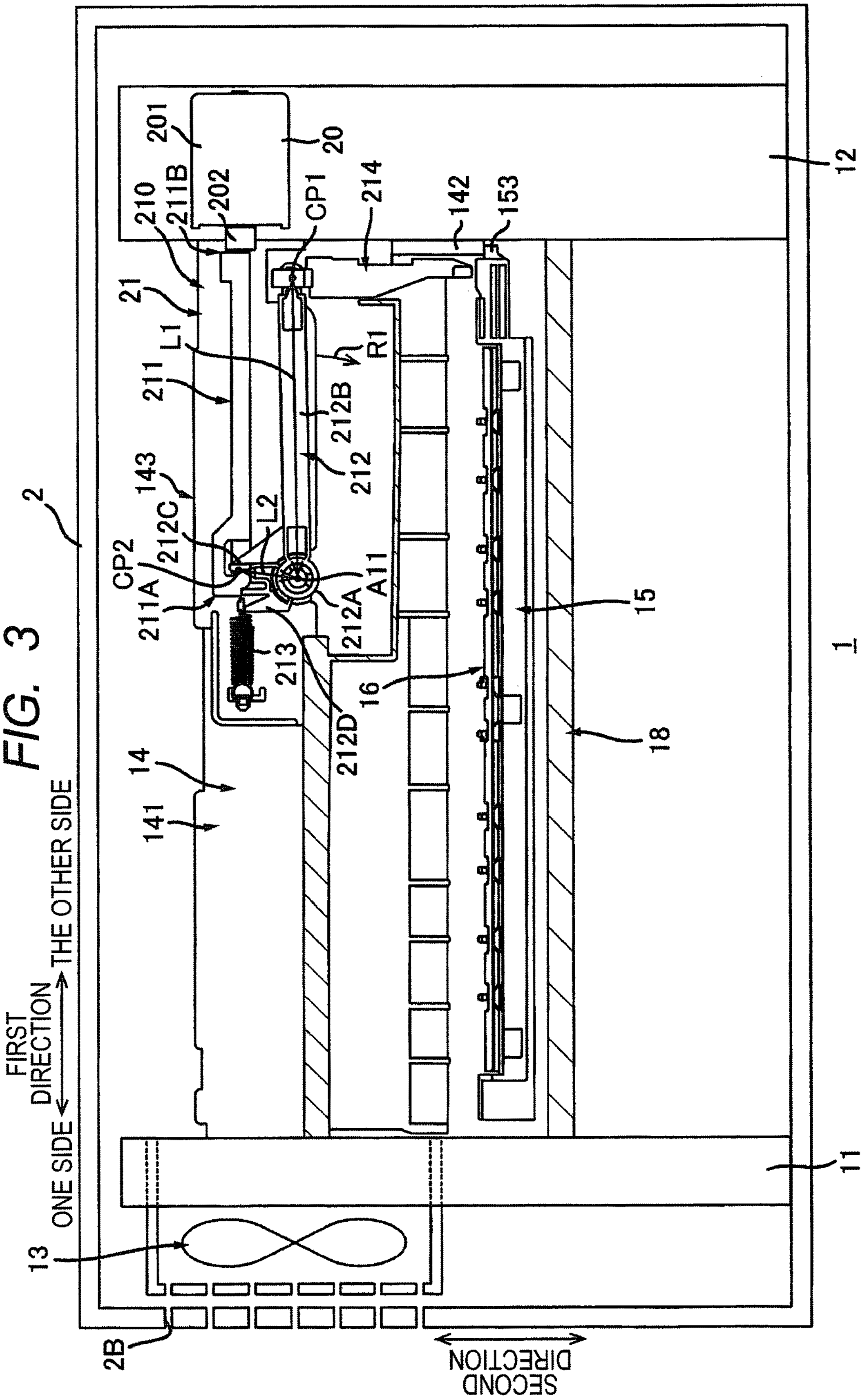
FIG. 3 is a cross-sectional view of the image forming apparatus shown in FIG. 1 taken along a line III-III.
Figure 8:
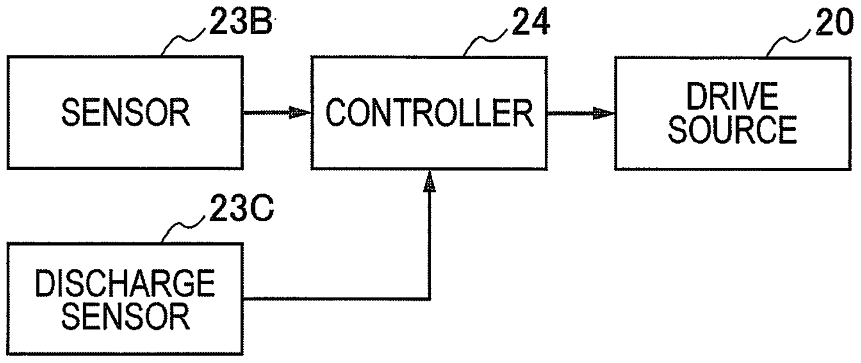
FIG. 8 is a block diagram for explaining electrical connection between each sensor, a controller, and a drive source.

As shown in FIG. 3, the image forming apparatus 1 further includes a first frame 11, a second frame 12, a fan 13, a duct 14, the chute 15 (see FIG. 1), and a conductive member 16 (see FIG. 5), two torsion springs 17A and 17B (see FIG. 5) as an example of a pressing member, a support frame 18 (see FIG. 1), a static eliminator 19 (see FIG. 6), a drive source 20, a movement mechanism 21, a conveyance roller 22 (see FIG. 1), sensors 23A and 23B (see FIG. 1), a discharge sensor 23C (see FIG. 1), and a controller 24 (see FIG. 8).

3.1 First Frame 11 and Second Frame 12

As shown in FIG. 3, the first frame 11 is located inside the main housing 2. The first frame 11 extends in the second direction and the third direction. The first frame 11 supports the fan 13. The first frame 11 supports one end of the duct 14 in the first direction.

The second frame 12 is located inside the main housing 2. The second frame 12 is located apart from the first frame 11 in the first direction. The second frame 12 extends in the second direction and the third direction. The second frame 12 supports the drive source 20. The second frame 12 supports the other end of the duct 14 in the first direction.

3.2 Fan 13

The fan 13 is attached to the first frame 11. The fan 13 faces an air discharge port 2B of the main housing 2. The fan 13 is located between the air discharge port 2B and the duct 14 in the first direction. The fan 13 sends the air in the duct 14 toward the air discharge port 2B. Thereby, the fan 13 discharges the air in the duct 14 through the air discharge port 2B.

3.3 Duct 14

As shown in FIG. 1, the duct 14 is located between the photosensitive drum 4 and the fuser 9 in the third direction. The duct 14 is located on the other side of the chute 15 in the second direction. As shown in FIG. 3, the duct 14 includes a duct body 141, a contact portion 142, and an attachment portion 143.

3.3.1 Duct Body 141

As shown in FIG. 3, the duct body 141 extends in the first direction. The duct body 141 includes a first plate 141A, a second plate 141B, and a plurality of louvers 141C.

Figure 4:
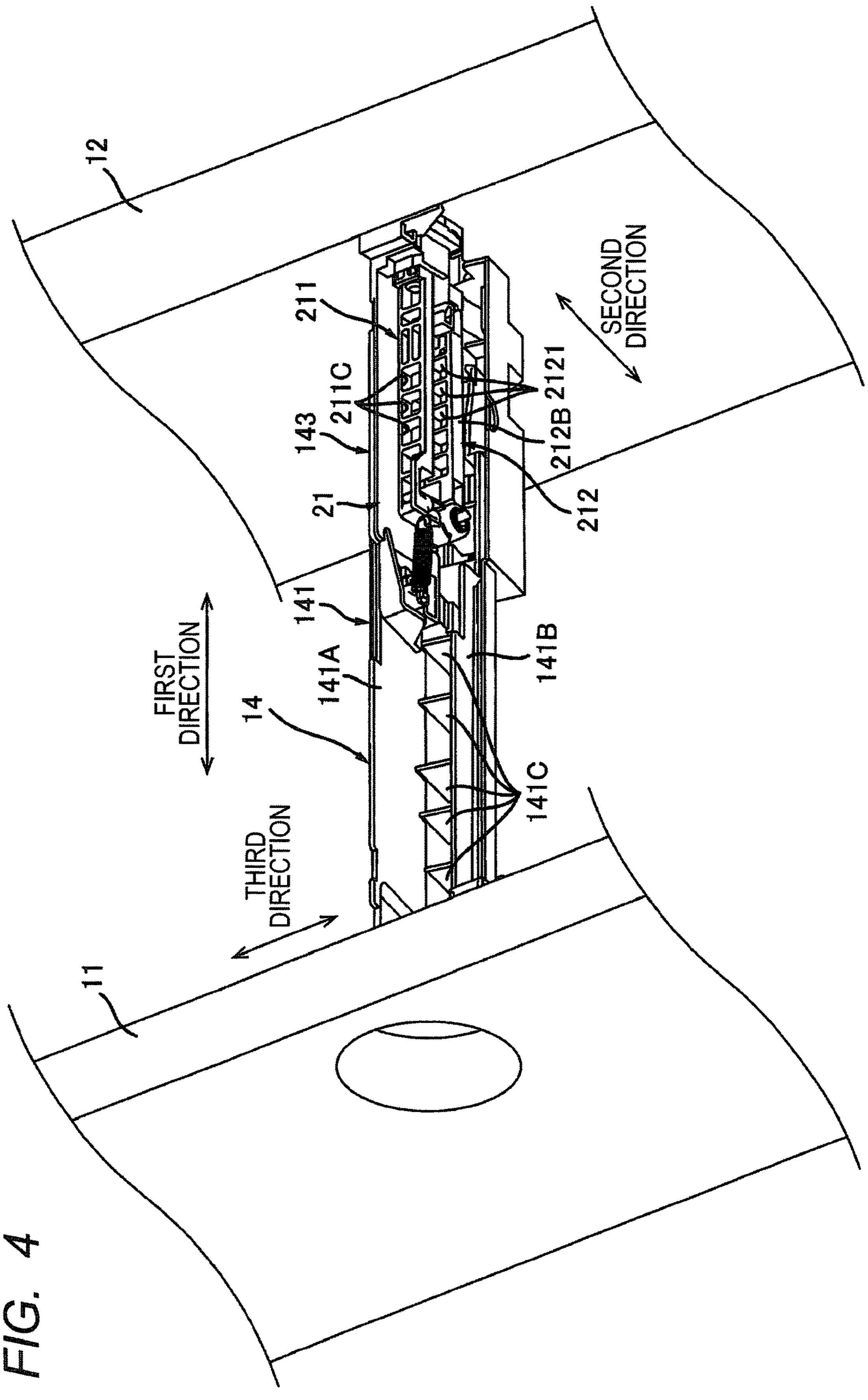
FIG. 4 is a perspective view of a duct and a movement mechanism shown in FIG. 3.

As shown in FIG. 1, the first plate 141A is located between the photosensitive drum 4 and the fuser 9 in the third direction. The first plate 141A extends in the first direction and the second direction. As shown in FIG. 4, the first plate 141A extends from the first frame 11 to the second frame 12 in the first direction.

As shown in FIG. 1, the second plate 141B is located between the first plate 141A and the fuser 9 in the third direction. The second plate 141B is located apart from the first plate 141A in the third direction. The second plate 141B extends in the first direction and the second direction. As shown in FIG. 4, the second plate 141B extends from the first frame 11 to the second frame 12 in the first direction. The air in the duct 14 flows in the first direction between the first plate 141A and the second plate 141B.

As shown in FIG. 4, the plurality of louvers 141C are located at one end of the duct 14 in the second direction. The plurality of louvers 141C are arranged at intervals in the first direction. Each of the plurality of louvers 141C extends in the second direction and the third direction. Each of the plurality of louvers 141C has a plate shape. The air between the photosensitive drum 4 and the fuser 9 enters the duct 14 through spaces between the plurality of louvers 141C.

3.3.2 Contact Portion 142

As shown in FIG. 1, the contact portion 142 is contactable with the chute 15. The contact portion 142 is located on one side in the second direction with respect to the duct body 141. The contact portion 142 is located between the duct body 141 and the support frame 18 in the second direction. The contact portion 142 extends in the second direction. The contact portion 142 extends from the duct body 141. As shown in FIG. 3, the contact portion 142 is located at the other end of the duct 14 in the first direction.

3.3.3 Attachment Portion 143

As shown in FIGS. 3 and 4, the movement mechanism 21 is attached to the attachment portion 143. The attachment portion 143 is part of the first plate 141A. The attachment portion 143 is located away from the first frame 11 and near the second frame 12 in the first direction. The attachment portion 143 extends from the other end of the first plate 141A to a central portion of the first plate 141A in the first direction.

3.4 Chute 15

As shown in FIG. 1, the chute 15 is located between the transfer roller 8 and the fuser 9 in the third direction. The chute 15 is located between the transfer roller 8 and the fixing guide 93 in the third direction. The chute 15 causes the sheet S that has passed through the transfer nip N1 to be directed toward the fixing nip N2. The chute 15 is located on one side in the second direction with respect to an imaginary plane I passing through the transfer nip N1 and the fixing nip N2.

As shown in FIGS. 1 and 2, the chute 15 is movable in the second direction between a first position (see FIG. 1) and a second position (see FIG. 2) farther from the imaginary plane I than at the first position.

As shown in FIG. 1, the chute 15 extends in the third direction. The chute 15 has a first end E1 and a second end E2 in the third direction. The second end E2 is located between the first end E1 and the fixing nip N2 in the third direction.

In a state where the chute 15 is located at the first position, the second end E2 of the chute 15 is separated from the fixing guide 93. In a state where the chute 15 is located at the first position, the second end E2 of the chute is located between the transfer nip N1 and the other end 93B of the fixing guide 93 in the second direction. In a state where the chute 15 is located at the first position, the transfer nip N1, the second end E2 of the chute 15, and the fixing nip N2 are aligned along the imaginary plane I. In a state where the chute 15 is located at the first position, the second end E2 of the chute 15 is located between the transfer nip N1 and the fixing nip N2 in the second direction. This allows the second end E2 of the chute 15 to support the leading edge of the sheet S near the fixing nip N2 in the second direction in a state where the chute 15 is located at the first position. Thus, the leading edge of the sheet S passes near the imaginary plane I toward the fixing nip N2. As a result, the leading edge of the sheet S smoothly enters the fixing nip N2.

As shown in FIG. 2, in a state where the chute 15 is located at the second position, the second end E2 of the chute 15 is adjacent to the fixing guide 93. In a state where the chute 15 is located at the second position, the second end E2 of the chute 15 is located on one side of the transfer nip N1 in the second direction. This, in a state where the chute 15 is located at the second position, the chute 15 allows the sheet S to bend farther toward one side in the second direction than the transfer nip N1 between the transfer nip N1 and the fixing nip N2. In a state where the chute 15 is located at the second position, the second end E2 of the chute is located between the one end 93A of the fixing guide 93 and the transfer nip N1 in the second direction. Thus, when the leading edge of the sheet S is conveyed from the chute 15 to the fixing guide 93, jam of the leading edge of the sheet S between the chute 15 and the fixing guide 93 is suppressed.

Figure 5:
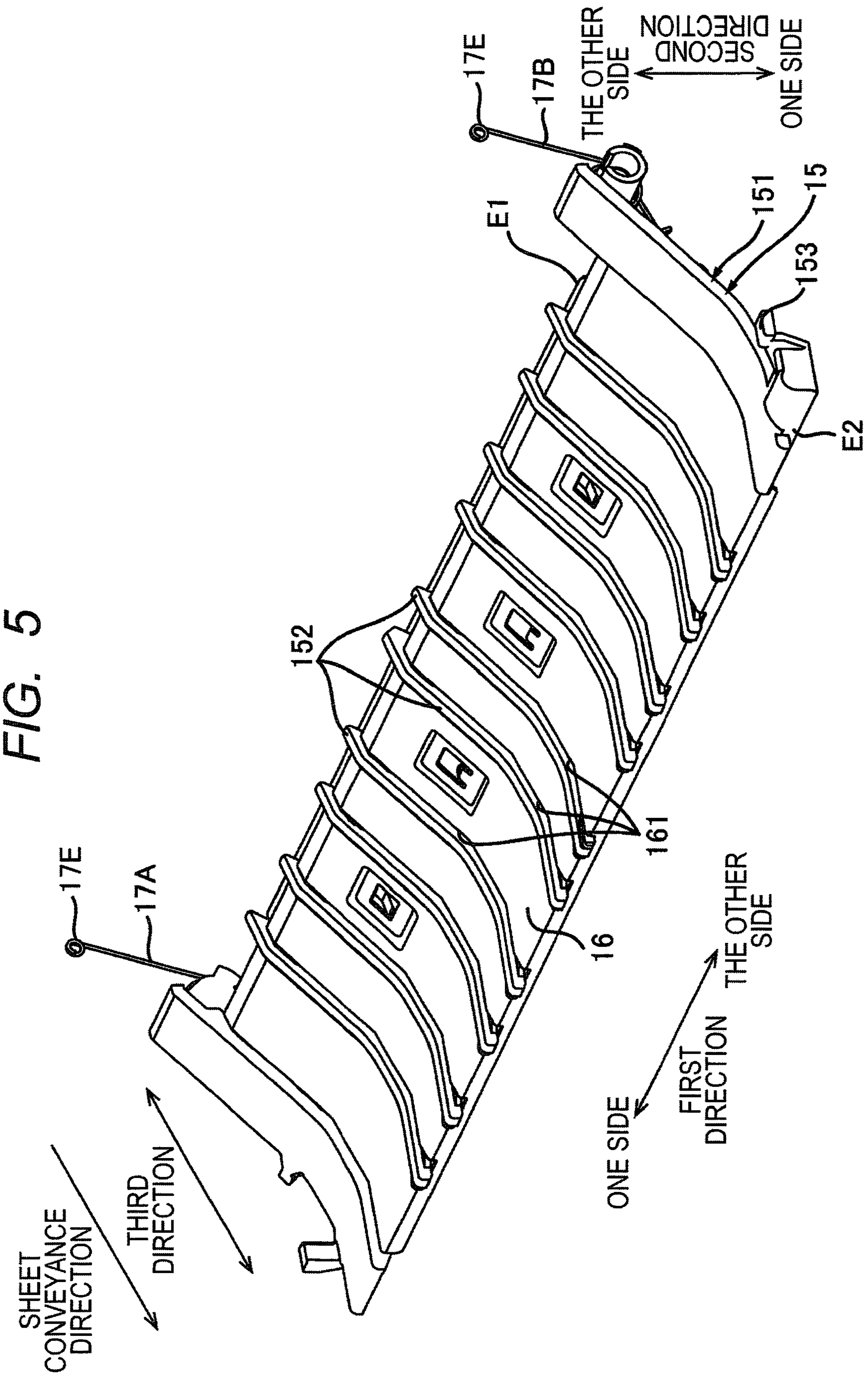
FIG. 5 is a perspective view of the chute shown in FIG. 1.

As shown in FIG. 5, the chute 15 extends in the first direction and the third direction. The chute 15 has a plate shape. The chute 15 is made of an insulator such as resin. The chute 15 has a chute body 151, a plurality of ribs 152, and a contact portion 153.

The chute body 151 extends in the first direction and the third direction. The chute body 151 has a plate shape. The chute body 151 has one surface and an other surface in the second direction.

The plurality of ribs 152 are located on the other surface of the chute body 151 in the second direction. The plurality of ribs 152 are arranged at intervals in the first direction. Each of the plurality of ribs 152 protrudes from the other surface of the chute body 151 in the second direction. Each of the plurality of ribs 152 extends in the third direction.

The contact portion 153 is located at the other end of the chute 15 in the first direction. The contact portion 153 is located on the other side of the chute body 151 in the first direction. The contact portion 153 extends in the first direction. The contact portion 153 extends from the other end of the chute body 151 in the first direction. As shown in FIG. 3, in a state where the chute 15 is located at the first position, the contact portion 153 contacts the contact portion 142 of the duct 14 in the second direction. Due to contact of the contact portion 153 with the contact portion 142, the chute 15 is positioned at the first position. In other words, the chute 15 is positioned at the first position by contacting the contact portion 142 of the duct 14.

3.5 Conductive Member 16

As shown in FIG. 5, the conductive member 16 is located on the other surface of the chute 15 in the second direction. Specifically, the conductive member 16 is located on the other surface of the chute body 151 in the second direction. The conductive member 16 extends in the first direction and the third direction. The conductive member 16 has a plate shape. The conductive member 16 has a plurality of slits 161. The ribs 152 of the chute 15 extend through the slits 161 and protrude to the other side of the conductive member 16 in the second direction. With this configuration, the sheet S being conveyed from the transfer nip N1 to the fixing nip N2 faces the conductive member 16 with a gap therebetween in the direction in which the ribs 152 protrude, in a state where the sheet S is in contact with the ribs 152 of the chute 15. When the sheet S passes through the transfer nip N1, the sheet S is charged by a transfer bias. Thus, when the sheet S being conveyed from the transfer nip N1 to the fixing nip N2 faces the conductive member 16 with a gap therebetween, the sheet S is subjected to a mirror image force in the direction toward the conductive member 16.

3.6 Torsion Springs 17A, 17B

The torsion spring 17A is attached to one end of the chute 15 in the first direction. Specifically, the torsion spring 17A is attached to one end of the chute body 151 in the first direction. The torsion spring 17A presses the chute 15 from the second position (see FIG. 2) toward the first position (see FIG. 1).

The torsion spring 17B is attached to the other end of the chute 15 in the first direction. Specifically, the torsion spring 17B is attached to the other end of the chute body 151 in the first direction. The torsion spring 17B presses the chute 15 from the second position (see FIG. 2) toward the first position (see FIG. 1) together with the torsion spring 17A. As shown in FIG. 5, each of the torsion springs 17A and 17B has a rounded end 17E. FIG. 5 shows a state before the chute 15 is assembled to the image forming apparatus 1. In a state where the chute 15 is assembled to the image forming apparatus 1, the rounded end 17E fits under the chute body 151 of the chute 15.

3.7 Support Frame 18

Figure 6:
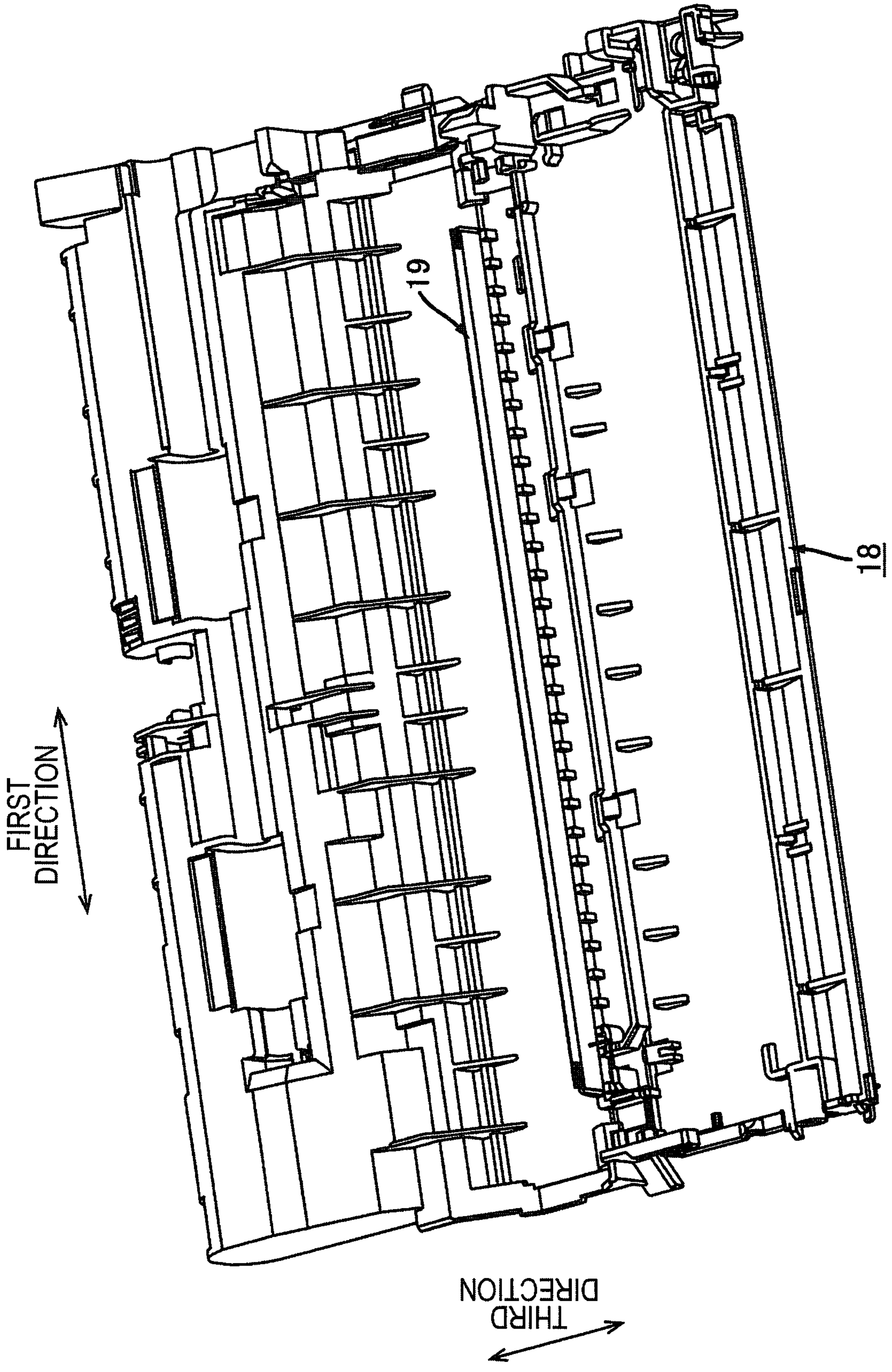
FIG. 6 is a perspective view of a support frame shown in FIG. 1.

As shown in FIG. 1, the support frame 18 supports the chute 15. The chute 15 is attached to the support frame 18. The support frame 18 is located on one side of the chute 15 in the second direction. The support frame 18 is located on the opposite side of the duct 14 with respect to the chute 15 in the second direction. As shown in FIG. 3, the support frame 18 is located on the opposite side of the movement mechanism 21 with respect to the chute 15 in the second direction. As shown in FIG. 6, the support frame 18 extends in the first direction and the third direction. The support frame 18 has a plate shape.

3.8 Static Eliminator 19

As shown in FIGS. 1 and 6, the static eliminator 19 is attached to the support frame 18. The static eliminator 19 is located between the transfer roller 8 and the chute 15 in the third direction. The static eliminator 19 removes part of the charge on the sheet S that has passed through the transfer nip N1. The static eliminator 19 extends in the first direction and the second direction. The static eliminator 19 has a plate shape. The static eliminator 19 faces the sheet S conveyed from the transfer nip N1 to the fixing nip N2 with a slight gap in the second direction.

3.9 Drive Source 20

As shown in FIG. 3, the drive source 20 is attached to the second frame 12. The drive source 20 is located away from the first frame 11 in the first direction. In this embodiment, the drive source 20 is a solenoid. Specifically, the drive source 20 is a pull solenoid. The drive source 20 includes a main body 201 and a plunger 202. The plunger 202 is movable in the first direction relative to the main body 201.

3.10 Movement Mechanism 21

As shown in FIG. 3, the movement mechanism 21 is located on the other side of the chute 15 in the second direction. The movement mechanism 21 is located between the first frame 11 and the second frame 12 in the first direction. A part of the movement mechanism 21 is located inside the duct 14. The movement mechanism 21 is attached to the attachment portion 143 of the duct 14. The movement mechanism 21 is located away from the first frame 11 and near the second frame 12 in the first direction. Because the movement mechanism 21 is located away from the first frame 11, even though the part of the movement mechanism 21 is located inside the duct 14, air between the photosensitive drum 4 and the fuser 9 is taken into the duct 14 through a space between the movement mechanism 21 and the first frame 11, and the air is discharged by the fan 13.

Figure 7:
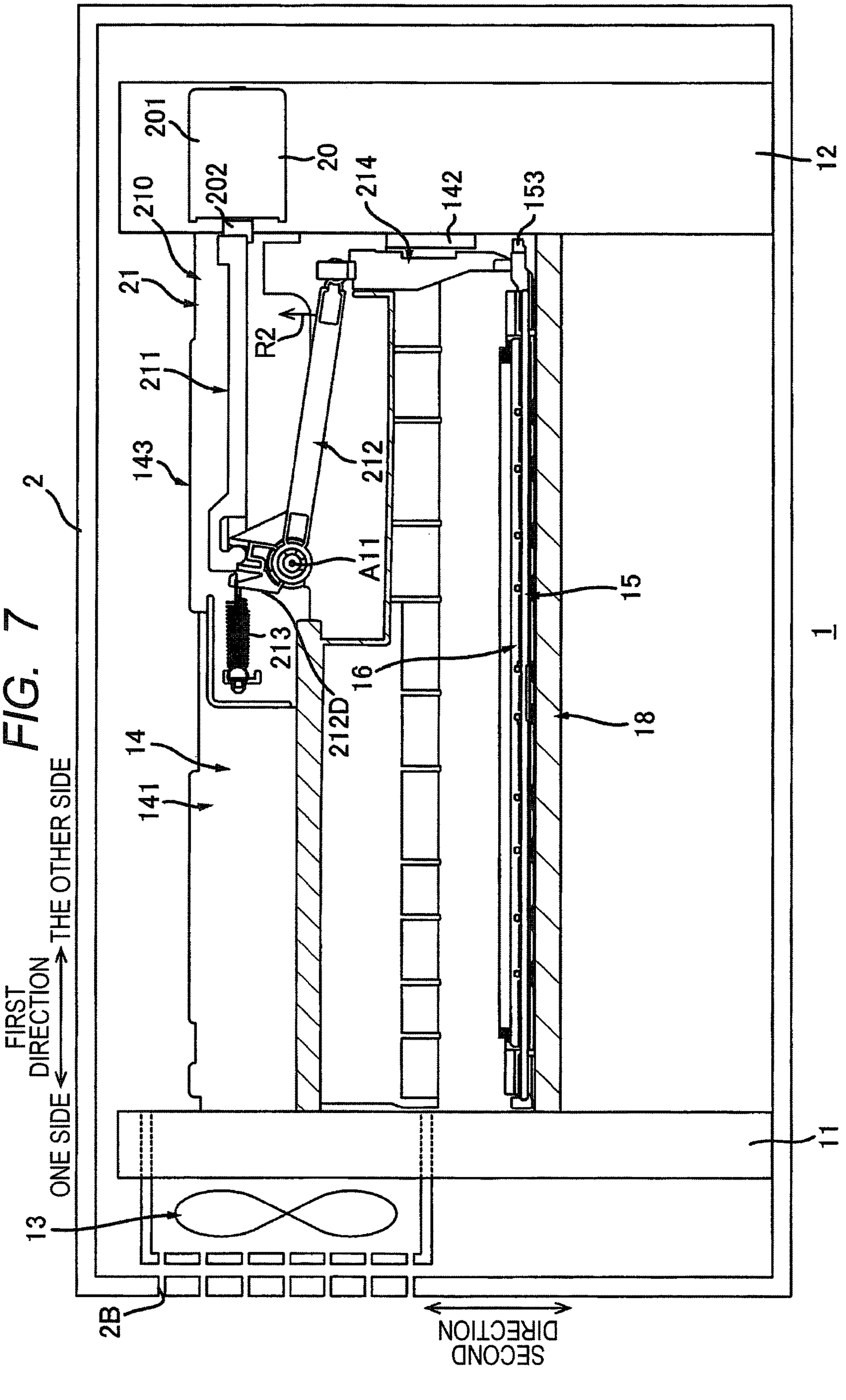
FIG. 7 shows a state where the chute shown in FIG. 3 is located at the second position.

As shown in FIGS. 3 and 7, the movement mechanism 21 moves the chute 15 between the first position (see FIG. 3) and the second position (see FIG. 7) by power (drive force) from the drive source 20.

Specifically, the movement mechanism 21 presses the chute 15 from the other side in the second direction, thereby moving the chute 15 from the first position to the second position against the force of the torsion springs 17A and 17B (see FIG. 5).

The movement mechanism 21 allows the chute 15 to move from the second position to the first position by releasing the pressure on the chute 15. Thus, when the movement mechanism 21 releases the pressure on the chute 15, the chute 15 moves from the second position to the first position due to the pressing force of the torsion springs 17A and 17B. Thus, the movement mechanism 21 is an example of a reciprocating mechanism that causes the chute 15 to reciprocate between the first position and the second position.

As shown in FIG. 3, the movement mechanism 21 includes an attachment 210, a first member 211, a second member 212, a pull spring 213, and a third member 214.

3.10.1 Attachment 210

The first member 211, the second member 212, and the pull spring 213 are attached to the attachment 210. The attachment 210 is attached to the attachment portion 143 of the duct 14 in a state where the first member 211, the second member 212, and the pull spring 213 are attached. The attachment 210 extends in the first direction and the second direction. The attachment 210 has a flat plate shape.

3.10.2 First Member 211

The first member 211 is movable in the first direction. The first member 211 is connected to the plunger 202 of the drive source 20. Specifically, the first member 211 extends in the first direction. The first member 211 has one end 211A and an other end 211B in the first direction. The one end 211A of the first member 211 in the first direction has a hook shape. The other end 211B of the first member 211 in the first direction is connected to the plunger 202 of the drive source 20.

As shown in FIG. 4, the first member 211 has a plurality of through holes 211C. Air in the duct 14 passes through the plurality of through holes 211C. This suppresses the first member 211 hindering the flow of air in the duct 14.

3.10.3 Second Member 212

As shown in FIGS. 3 and 7, the second member 212 is rotatable about an axis A11. The axis A11 extends in the third direction. The second member 212 is rotatable in a first rotation direction R1 or a second rotation direction R2. The second rotation direction R2 is opposite to the first rotation direction R1.

Specifically, as shown in FIG. 3, the second member 212 is rotatable in the first rotation direction R1 in a state where the movement mechanism 21 releases the pressure on the chute 15. As shown in FIGS. 3 and 7, the rotation of the second member 212 in the first rotation direction R1 causes the movement mechanism 21 to move the chute 15 from the first position to the second position. That is, the first rotation direction R1 is the direction in which the chute 15 moves from the first position to the second position.

As shown in FIG. 7, the second member 212 is rotatable in the second rotation direction R2 in a state where the chute 15 is located at the second position by the movement mechanism 21. As shown in FIGS. 7 and 3, rotation of the second member 212 in the second rotation direction R2 causes the movement mechanism 21 to release the pressure on the chute 15. This causes the chute 15 to move from the second position to the first position. That is, the second rotation direction R2 is the direction in which the chute 15 moves from the second position to the first position.

As shown in FIG. 3, the second member 212 is located on one side of the first member 211 in the second direction. The second member 212 is located between the first member 211 and the chute 15 in the second direction. The second member 212 extends in the first direction in a state where the movement mechanism 21 releases the pressure on the chute 15. The second member 212 has a rotation shaft 212A, a first arm 212B, a second arm 212C, and a third arm 212D.

The rotation shaft 212A is located at one end of the second member 212 in the first direction. The rotation shaft 212A is located away from the second frame 12 in the first direction. The rotation shaft 212A extends in the third direction. The rotation shaft 212A has a cylindrical shape.

As shown in FIG. 3, in a state where the movement mechanism 21 releases the pressure on the chute 15, the first arm 212B extends in the first direction from the rotation shaft 212A toward the second frame 12. As shown in FIG. 4, the first arm 212B has a plurality of through holes 2121. The air in duct 14 passes through the plurality of through holes 2121. This suppresses the first arm 212B hindering the flow of air in the duct 14.

In a state where the movement mechanism 21 releases the pressure on the chute 15, the second arm 212C extends in the second direction from the rotation shaft 212A toward the first member 211. The one end 211A of the first member 211 in the first direction is hooked on the second arm 212C. Thereby, the second member 212 is connected to the first member 211.

A distance L1 between the axis A11 and a connection portion CP1 between the third member 214 and the first arm 212B is longer than a distance L2 between the axis A11 and a contact portion CP2 between the first member 211 and the second arm 212C. Thereby, the distance over which the first arm 212B moves the third member 214 is made longer than the distance over which the first member 211 moves the second arm 212C. Thus, when the movement mechanism 21 presses the chute 15, the moving distance of the third member 214 is made longer than the moving distance of the first member 211.

The third arm 212D extends from the rotation shaft 212A. In a state where the movement mechanism 21 releases the pressure on the chute 15, the third arm 212D is located on the opposite side of the drive source 20 with respect to the second arm 212C in the first direction.

3.10.4 Pull Spring 213

As shown in FIG. 7, in a state where the movement mechanism 21 causes the chute 15 to be located at the second position, the pull spring 213 pulls the second member 212 in the second rotation direction R2. One end of the pull spring 213 is attached to the attachment 210. The other end of the pull spring 213 is attached to the third arm 212D of the second member 212. As shown in FIG. 3, in a state where the movement mechanism 21 releases the pressure on the chute 15, the second member 212 is rotated in the first rotation direction R1 against the force of the pull spring 213 by the power from the drive source 20.

3.10.5 Third Member 214

As shown in FIG. 3, the third member 214 is connected to the other end of the second member 212 in the first direction. Specifically, the third member 214 is connected to the tip of the first arm 212B. The third member 214 extends in the second direction. The third member 214 is movable in the second direction. Specifically, as shown in FIGS. 3 and 7, the third member 214 moves to one side in the second direction as the second member 212 rotates in the first rotation direction R1. When moving to one side in the second direction, the third member 214 presses the chute 15 to the one side in the second direction. Thereby, the third member 214 causes the chute 15 to move from the first position to the second position. As shown in FIGS. 7 and 3, the third member 214 moves to the other side in the second direction as the second member 212 rotates in the second rotation direction R2. The third member 214 releases the pressure on the chute 15 by moving to the other side in the second direction.

3.11 Conveyance Roller 22

As shown in FIG. 1, the conveyance roller 22 is located on the opposite side of the fuser 9 with respect to the transfer roller 8 in the third direction. The conveyance roller 22 conveys the sheet S toward the transfer nip N1. The conveyance roller 22 is located between the sensor 23A and the sensor 23B in the direction in which the sheet S is conveyed.

3.12 Sensors 23A and 23B

The sensor 23A is located on the opposite side of the transfer roller 8 with respect to the conveyance roller 22 in the third direction. The sensor 23A detects the sheet S.

The sensor 23B is located between the conveyance roller 22 and the transfer roller 8 in the third direction. The sensor 23B detects the sheet S.

3.13 Discharge Sensor 23C

The discharge sensor 23C is located adjacent to the discharge port 2A. The discharge sensor 23C detects the sheet S that passes through the discharge port 2A.

3.14 Controller 24

As shown in FIG. 8, the controller 24 is electrically connected to the sensors 23A, 23B, the discharge sensor 23C, and the drive source 20. The controller 24 is, for example, a control circuit board that controls the operation of the image forming apparatus 1. The controller 24 includes a CPU (Central Processing Unit) and a memory. The controller 24 controls the operation of the image forming apparatus 1 by causing the CPU to execute programs stored in the memory. The controller 24 may include an ASIC (Application Specific Integrated Circuit). The controller 24 controls the drive source 20 based on signals from the sensor 23B and the discharge sensor 23C, for example.

4. CONTROL OF IMAGE FORMING APPARATUS 1

Next, control of the image forming apparatus 1 will be described with reference to FIGS. 1 to 3, 7, 9 and 10.

Figure 9:
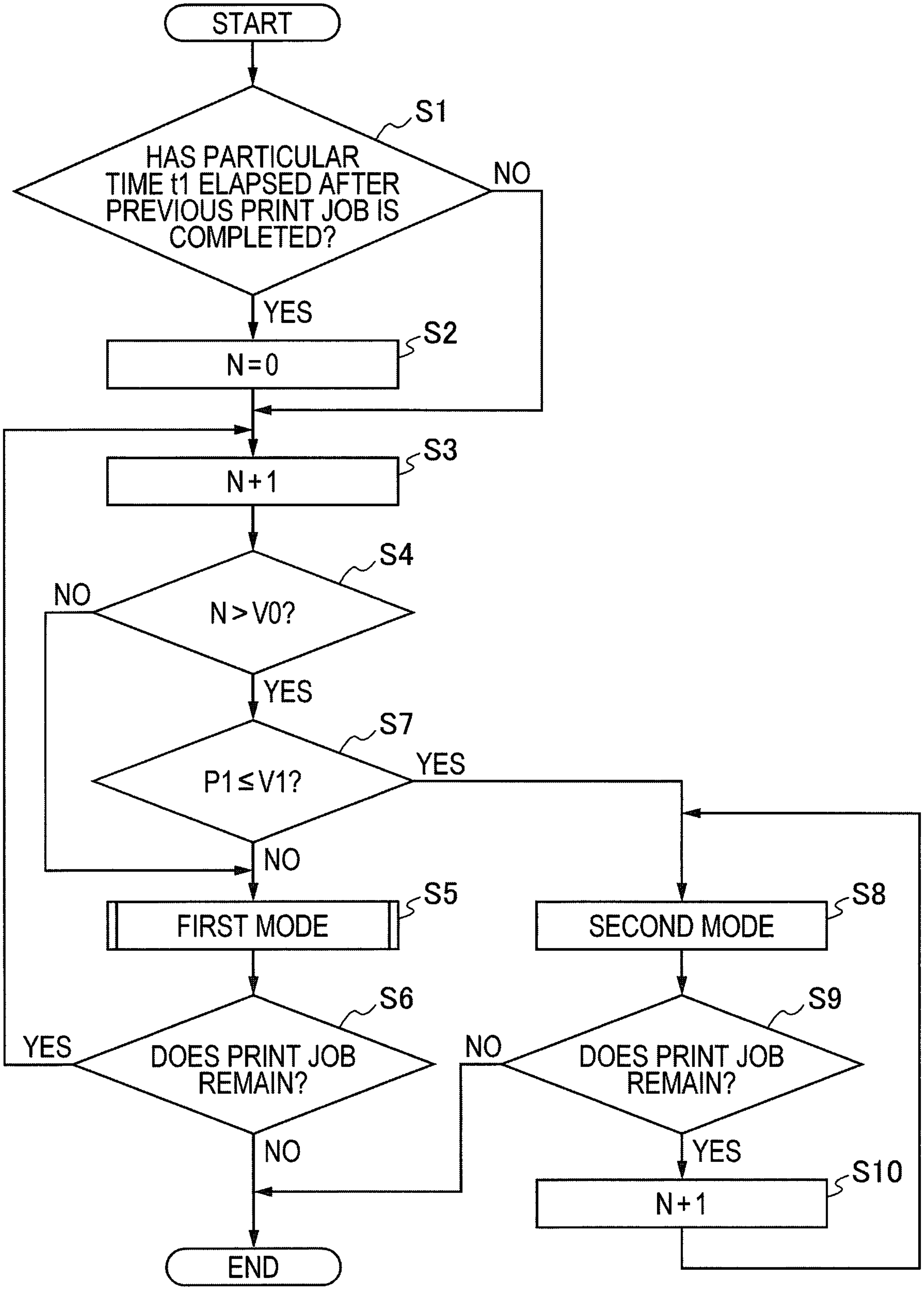
FIG. 9 is a flowchart for explaining control of the image forming apparatus by the controller.

As shown in FIG. 9, in response to receiving a print job, the controller 24 determines whether a particular time t1 has elapsed since the previous print job is completed (S1).

If the particular time t1 has elapsed since the previous print job is completed (S1: YES), the controller 24 resets a number of continuously printed pages N stored in the memory to 0 (S2).

The "number of continuously printed pages N" is the cumulative number of continuously printed pages. The "continuously printed" means that after one page is printed, the next one page is printed before the particular time t1 elapses.

The particular time t1 is a period of time during which the temperature of the rubber layer 922 heated by the heating unit 91 in the execution of the previous print job drops and the expansion of the rubber layer 922 subsides. For example, in this embodiment, the particular time t1 is 10 minutes.

Next, the controller 24 adds one page to the number of continuously printed pages N and stores the number in the memory (S3), and determines whether the number of continuously printed pages N exceeds a threshold V0 (S4). In this embodiment, the threshold V0 is two.

If the number of continuously printed pages N is smaller than or equal to the threshold V0 (S4: NO), the controller 24 executes a first mode (S5). Thus, when printing first and second pages after the number of continuously printed pages N is reset to 0, in which the temperature of the rubber layer 922 is presumed to be low, the controller 24 always executes the first mode.

In the first mode, as shown in FIGS. 1 and 2, after the sheet S reaches the fuser 9, the controller 24 moves the chute 15 from the first position to the second position. Thereby, the chute 15 moves from the first position to the second position after the sheet S reaches the fuser 9. In other words, the chute 15 moves from the first position to the second position after the leading edge of the sheet S reaches the chute 15. By moving the chute 15 from the first position to the second position after the leading edge of the sheet S reaches the chute 15, the chute 15 is located at the second position in a state where the sheet S is attracted to the chute 15. For example, the controller 24 moves the chute 15 from the first position to the second position after the sheet S enters the fixing nip N2.

Specifically, when the sheet S is conveyed by the conveyance roller 22 toward the transfer nip N1, the leading edge of the sheet S contacts the sensor 23B. Then, the sensor 23B changes from an OFF state to an ON state.

As shown in FIG. 1, the sheet S having passed through the transfer nip N1 is conveyed toward the fuser 9 while being supported by the chute 15 located at the first position.

Figure 10:
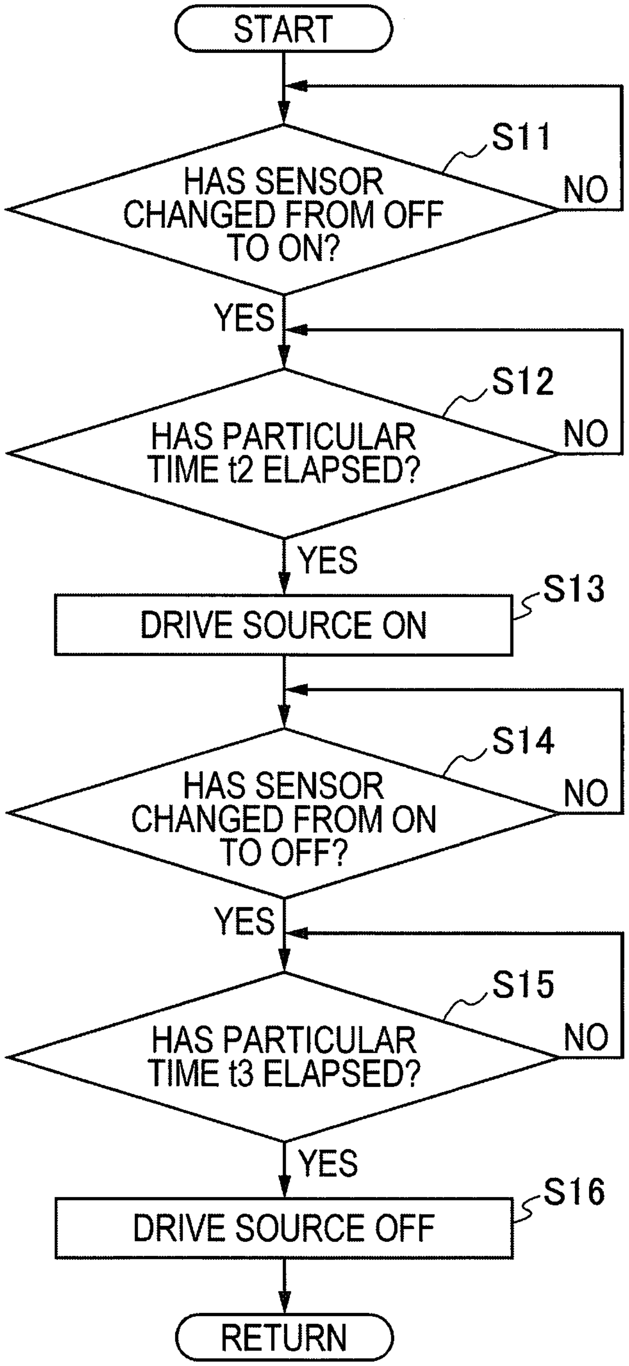
FIG. 10 is a flowchart of a first mode shown in FIG. 9.

As shown in FIG. 10, when the sensor 23B changes from the OFF state to the ON state (S11: YES) and a particular time t2 has elapsed (S12: YES), the controller 24 actuates the drive source 20 (S13). That is, in the first mode, the controller 24 actuates the drive source 20 when conveying one sheet S. The particular time t2 is a period of time required for the leading edge of the sheet S that contacts the sensor 23B to reach the fuser 9.

As shown in FIGS. 3 and 7, after the sheet S reaches the fuser 9, the movement mechanism 21 moves the chute 15 from the first position to the second position by the power from the drive source 20.

By locating the chute 15 at the second position after the sheet S reaches the fuser 9, as shown in FIG. 2, the bending of the sheet S between the transfer nip N1 and the fixing nip N2 is allowed.

After the sheet S passes through the transfer nip N1, the controller 24 moves the chute 15 from the second position to the first position (see FIG. 1). Thereby, the chute 15 moves from the second position to the first position after the sheet S passes through the transfer nip N1.

Specifically, when the trailing edge of the sheet S separates from the sensor 23B, the sensor 23B changes from the ON state to the OFF state.

As shown in FIG. 10, when the sensor 23B changes from the ON state to the OFF state (S14: YES) and a particular time t3 has elapsed (S15: YES), the controller 24 stops the drive source 20 (S16). The particular time t3 is a period of time required for the trailing edge of the sheet S separated from the sensor 23B to pass through the transfer nip N1.

Then, as shown in FIGS. 7 and 3, the movement mechanism 21 releases the pressure on the chute 15 by the force of the pull spring 213. Then, the chute 15 moves from the second position to the first position by the force of the torsion springs 17A and 17B.

Next, as shown in FIG. 9, when a print job remains (S6: YES), the controller 24 prints the next one page. Specifically, when a print job remains (S6: YES), as described above, the controller 24 adds one page to the number of continuously printed pages N and stores the number in the memory (S3), and determines whether the number of continuously printed pages N exceeds the threshold V0 (S4).

When the number of continuously printed pages N exceeds the threshold V0 (S4: YES), the controller 24 determines whether a parameter P1 is smaller than or equal to a threshold V1 (S7).

In this embodiment, the parameter P1 decreases as the conveyance speed of the sheet S at the fixing nip N2 increases. The parameter P1 is, for example, a period of time from when the discharge sensor 23C detects the leading edge of the sheet S to when the discharge sensor 23C detects the trailing edge of the sheet S when one sheet S is discharged from the discharge port 2A (see FIG. 2). As described above, when the rubber layer 922 (see FIG. 1) expands, the conveyance speed of the sheet S at the fixing nip N2 increases. Then, the period of time from when the discharge sensor 23C detects the leading edge of the sheet S to when the discharge sensor 23C detects the trailing edge of the sheet S when one sheet S is discharged from the discharge port 2A" is shortened. That is, in a case where the period of time from when the discharge sensor 23C detects the leading edge of the sheet S to when the discharge sensor 23C detects the trailing edge of the sheet S when one sheet S is discharged from the discharge port 2A is adopted as the parameter P1, the parameter P1 decreases as the conveyance speed of the sheet S at the fixing nip N2 increases.

The threshold V1 is a threshold for the parameter P1. When the parameter P1 is greater than the threshold V1, the conveyance speed of the sheet S at the fixing nip N2 is lower than the conveyance speed of the sheet S at the transfer nip N1. Specifically, when the parameter P1 is greater than the threshold V1, the difference between the conveyance speed of the sheet S at the transfer nip N1 and the conveyance speed of the sheet S at the fixing nip N2 is large, and bending (deflection) of the sheet S between the transfer nip N1 and the fixing nip N2 becomes an unacceptable level in a state where the chute 15 is located at the first position.

Thus, when the parameter P1 is greater than the threshold V1 (S7: NO), the controller 24 executes the above-described first mode (S5).

When the parameter P1 becomes smaller than or equal to the threshold V1, the difference between the conveyance speed of the sheet S at the fixing nip N2 and the conveyance speed of the sheet S at the transfer nip N1 becomes small, and bending (deflection) of the sheet S between the transfer nip N1 and the fixing nip N2 becomes an acceptable level in a state where the chute 15 is located at the first position. Note that, even when the parameter P1 is smaller than or equal to the threshold V1, the conveyance speed of the sheet S at the fixing nip N2 is lower than the conveyance speed of the sheet S at the transfer nip N1.

Thus, when the parameter P1 is smaller than or equal to the threshold V1 (S7: YES), the controller 24 executes a second mode (S8).

In the second mode, as shown in FIG. 1, the controller 24 does not move the chute 15 from the first position to the second position. Specifically, in the second mode, the controller 24 does not actuate the drive source 20 (see FIG. 3) when conveying one sheet S. Thus, as shown in FIG. 3, the movement mechanism 21 is maintained in a state where the pressure on the chute 15 is released by the force of the pull spring 213. Thus, the chute 15 is maintained at the first position by the pressing force of the torsion springs 17A and 17B.

In this way, the chute 15 is maintained at the first position by the torsion springs 17A and 17B without actuating the drive source 20. Thus, when the number of continuously printed pages N increases and the conveyance speed of the sheet S at the fixing nip N2 increases, the power consumption is reduced.

Next, when a print job remains (S9: YES), the controller 24 adds one page to the number of continuously printed pages N and stores the number in the memory (S10), and continues the second mode (S8).

When a plurality of sheets S are printed continuously, the rubber layer 922 continues to be heated by the heating unit 91. Thus, the rubber layer 922 expands and the conveyance speed of the sheet S at the fixing nip N2 increases, and the expansion of the rubber layer 922 does not subside during continuous printing, and the conveyance speed of the sheet S at the fixing nip N2 does not decrease.

Thus, when the second mode is executed (S7: YES), the controller 24 continues the second mode.

When there are no more print jobs (S9: NO), the controller 24 finishes printing. That is, the controller 24 continues the second mode at least until the print job that is currently printed is completed.

5. OPERATIONS AND EFFECTS (1) According to the image forming apparatus 1, as shown in FIG. 9, when the parameter P1 is greater than the threshold V1 (S7: NO), that is, when the conveyance speed of the sheet S at the fixing nip N2 is slow, the controller 24 executes the first mode (S5).

As shown in FIG. 2, when the conveyance speed of the sheet S at the fixing nip N2 is slow, the difference between the conveyance speed of the sheet S at the fixing nip N2 and the conveyance speed of the sheet S at the transfer nip N1 causes the sheet S between the transfer nip N1 and the fixing nip N2 to bend.

Thus, in the first mode, the controller 24 actuates the drive source 20 (see FIG. 3). Then, as shown in FIGS. 3 and 7, the movement mechanism 21 moves the chute 15 from the first position (see FIGS. 3 and 1) to the second position (see FIGS. 7 and 2) by the power from the drive source 20 against the pressing force of the torsion springs 17A and 17B (see FIG. 5).

Accordingly, as shown in FIG. 2, when the conveyance speed of the sheet S at the fixing nip N2 is slow, the chute 15 is located at the second position to allow the sheet S to bend.

As a result, the sheet S is stably conveyed between the transfer nip N1 and the fixing nip N2.

As shown in FIG. 9, when the parameter P1 becomes smaller than or equal to the threshold V1 (S7: YES), that is, when the conveyance speed of the sheet S at the fixing nip N2 increases, the controller 24 executes the second mode (S8).

As shown in FIG. 1, when the conveyance speed of the sheet S at the fixing nip N2 increases, the difference between the conveyance speed of the sheet S at the fixing nip N2 and the conveyance speed of the sheet S at the transfer nip N1 becomes small and the bending of the sheet S becomes small. Thus, when the conveyance speed of the sheet S at the fixing nip N2 increases, it becomes unnecessary to move the chute 15 from the first position to the second position.

Thus, in the second mode, the controller 24 does not actuate the drive source 20. That is, the chute 15 is maintained at the first position by the pressing force of the torsion springs 17A and 17B.

With this control, when the conveyance speed of the sheet S at the fixing nip N2 increases, the chute 15 is located at the first position to stably convey the sheet S between the transfer nip N1 and the fixing nip N2, without consuming power for actuating the drive source 20.

As a result, the sheet S is stably conveyed between the transfer nip N1 and the fixing nip N2 while suppressing an increase in power consumption.

(2) According to the image forming apparatus 1, as shown in FIG. 9, when the second mode is executed (S7: YES), the controller 24 continues the second mode at least until the print job that is currently printed is completed.

Specifically, when a print job remains (S9: YES), the controller 24 adds one page to the number of continuously printed pages N and stores the number in the memory (S10), and continues the second mode (S8).

When there are no more print jobs (S9: NO), the controller 24 ends printing.

Thus, after executing the second mode, power for actuating the drive source 20 is not consumed at least until the print job that is currently printed is completed.

As a result, an increase in power consumption is further suppressed.

(3) According to the image forming apparatus 1, the parameter P1 is the period of time from when the discharge sensor 23C detects the leading edge of the sheet S to when the discharge sensor 23C detects the trailing edge of the sheet S when one sheet S is discharged from the discharge port 2A.

The period of time from when the discharge sensor 23C detects the leading edge of the sheet S to when the discharge sensor 23C detects the trailing edge of the sheet S when one sheet S is discharged from the discharge port 2A becomes shorter as the conveyance speed of the sheet S at the fixing nip N2 increases.

Thus, by defining the parameter P1 as the period of time from when the discharge sensor 23C detects the leading edge of the sheet S to when the discharge sensor 23C detects the trailing edge of the sheet S when one sheet S is discharged from the discharge port 2A, the mode is switched from the first mode to the second mode by using the discharge sensor 23C.

(4) According to the image forming apparatus 1, as shown in FIG. 1, the chute 15 is located on one side in the second direction with respect to the imaginary plane I passing through the transfer nip N1 and the fixing nip N2. As shown in FIG. 3, the movement mechanism 21 is located on the other side of the chute 15 in the second direction.

Thus, the movement mechanism 21 is arranged efficiently by utilizing the space between the photosensitive drum 4 and the fuser 9.

Thus, compared with a case where the chute 15 is located on one side of the imaginary plane I in the second direction and the movement mechanism is located on one side of the chute 15 in the second direction, an increase in the size of the image forming apparatus 1 in the second direction is suppressed.

As a result, the sheet S is stably conveyed between the transfer nip N1 and the fixing nip N2 while suppressing an increase in the size of the image forming apparatus 1 in the second direction.

(5) According to the image forming apparatus 1, as shown in FIG. 1, the chute 15 is positioned at the first position by contacting the contact portion 142 of the duct 14.

Thus, the chute 15 is positioned at the first position by utilizing the duct 14 between the photosensitive drum 4 and the fuser 9.

Thus, the positional accuracy of the chute 15 with respect to the fuser 9 is ensured with a simple configuration.

(6) According to the image forming apparatus 1, as shown in FIG. 1, in a state where the chute 15 is located at the first position, the second end E2 of the chute 15 is located between the transfer nip N1 and the fixing nip N2 in the second direction.

Thus, in a state where the chute 15 is located at the first position, the second end E2 of the chute 15 supports the leading edge of the sheet S near the fixing nip N2 in the second direction.

Thus, the leading edge of the sheet S smoothly enters the fixing nip N2.

(7) According to the image forming apparatus 1, as shown in FIG. 2, in a state where the chute 15 is located at the second position, the second end E2 of the chute 15 is located on one side of the transfer nip N1 in the second direction.

Thus, in a state where the chute 15 is located at the second position, the sheet S that has entered the fixing nip N2 is allowed to bend toward one side in the second direction with respect to the transfer nip N1.

(8) According to the image forming apparatus 1, as shown in FIG. 3, the movement mechanism 21 includes the first member 211, the second member 212, and the third member 214. The first member 211 is connected to the drive source 20. The first member 211 is movable in the first direction. The second member 212 is connected to the first member 211. The second member 212 is rotatable about the axis A11. The third member 214 is connected to the second member 212. The third member 214 is movable in the second direction.

Thus, as shown in FIG. 7, by moving the first member 211 in the first direction by the power from the drive source 20, the second member 212 is rotated and the third member 214 is moved in the second direction.

Thus, the moving distance of the third member 214 is made longer than the moving distance of the first member 211 depending on the radius of rotation of the second member 212.

As a result, the space for moving the first member 211 is reduced, and an increase in the size of the image forming apparatus 1 is suppressed.

(9) According to the image forming apparatus 1, as shown in FIG. 3, a part of the movement mechanism 21 is located inside the duct 14.

Thus, the space inside the duct 14 is utilized to arrange the movement mechanism 21.

As a result, an increase in the size of the image forming apparatus 1 is further suppressed.

(10) According to the image forming apparatus 1, as shown in FIG. 3, the movement mechanism 21 is located away, in the first direction, from the first frame 11 supporting the fan 13.

Thus, even though a part of the movement mechanism 21 is located inside the duct 14, the air between the photosensitive drum 4 and the fuser 9 is taken into the duct 14 through the space between the movement mechanism 21 and the first frame 11, and the air is discharged by the fan 13.

(11) According to the image forming apparatus 1, as shown in FIGS. 1 and 2, in the first mode, the chute 15 moves from the first position (see FIG. 1) to the second position (see FIG. 2) after the sheet S reaches the fuser 9, and moves from the second position (see FIG. 2) to the first position (see FIG. 1) after the sheet S passes through the transfer nip N1.

Thus, as shown in FIG. 1, the sheet S is supported by the chute 15 located at the first position until the sheet S reaches the fuser 9. And, as shown in FIG. 2, the chute 15 is located at the second position after the sheet S reaches the fuser 9 and until the sheet S passes through the transfer nip N1, so that bending of the sheet S is allowed.

6. MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below. In the modifications described below, the same reference numerals are given to the same members as in the embodiment described above, and the description thereof is omitted.

(1) A parameter P2 may increase as the conveyance speed of the sheet S at the fixing nip N2 increases.

Figure 11:
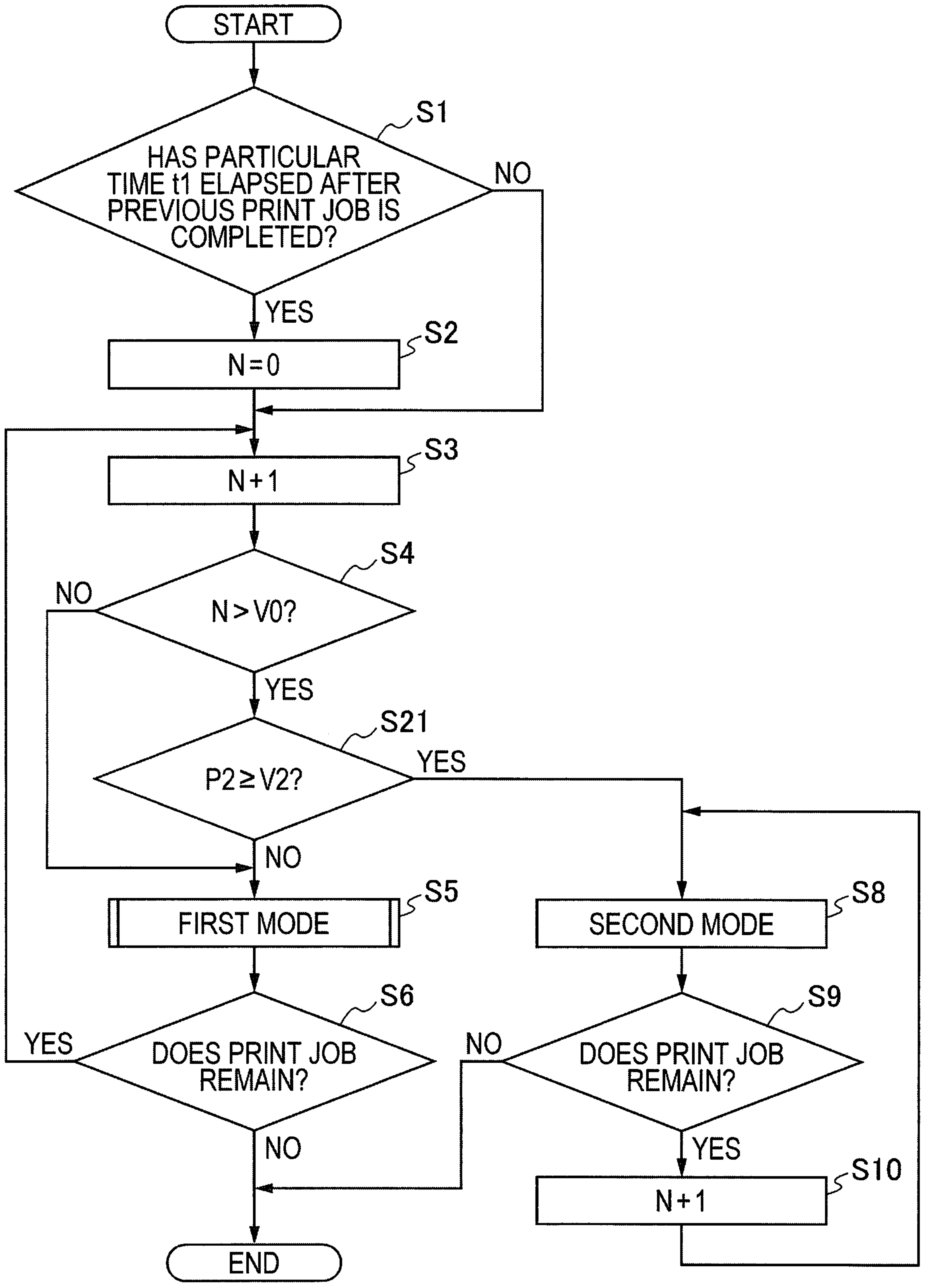
FIG. 11 is a flowchart for explaining control of an image forming apparatus by a controller.

FIG. 11 shows a modification in which the parameter P2 increases as the conveyance speed of the sheet S at the fixing nip N2 increases. When the parameter P2 is smaller than a threshold V2, the difference between the conveyance speed of the sheet S at the transfer nip N1 and the conveyance speed of the sheet S at the fixing nip N2 is large, and bending (deflection) of the sheet S between the transfer nip N1 and the fixing nip N2 becomes an unacceptable level in a state where the chute 15 is located at the first position. Thus, when the parameter P2 is smaller than the threshold V2 (521: NO), that is, when the conveyance speed of the sheet S at the fixing nip N2 is slow, the controller 24 executes the first mode (S5).

In a case where the parameter P2 increases as the conveyance speed of the sheet S at the fixing nip N2 increases, when the parameter P2 is greater than or equal to the threshold V2 (521: YES), that is, when the conveyance speed of the sheet S at the fixing nip N2 becomes fast, the controller 24 executes the second mode (S8).

The parameter P2 is, for example, the number of continuously printed pages N.

As the number of continuously printed pages N increases, the rubber layer 922 of the pressure roller 92 expands due to the heat from the heating unit 91.

Thus, the circumferential speed of the pressure roller 92 increases as the number of continuously printed pages N increases. Thus, the conveyance speed of the sheet S at the fixing nip N2 increases as the number of continuously printed pages N increases.

Thus, the number of continuously printed pages N is utilized as the parameter P2 to switch from the first mode to the second mode.

(2) As shown in FIG. 1, the image forming apparatus 1 may include a temperature sensor 100. The temperature sensor 100 measures the temperature of the pressure roller 92. The temperature sensor 100 is, for example, a non-contact temperature sensor such as an infrared sensor. In this case, the parameter P2 may be the measurement value of the temperature sensor 100.

As described above, the rubber layer 922 of the pressure roller 92 expands as the heat from the heating unit 91 raises the temperature of the rubber layer 922 of the pressure roller 92.

Thus, as the temperature of the pressure roller 92 increases, the circumferential speed of the pressure roller 92 increases. Accordingly, the conveyance speed of the sheet S at the fixing nip N2 increases as the temperature of the pressure roller 92 increases.

Thus, the temperature of the pressure roller 92 measured by the temperature sensor 100 is utilized as the parameter P2 to switch from the first mode to the second mode.

Figure 12:
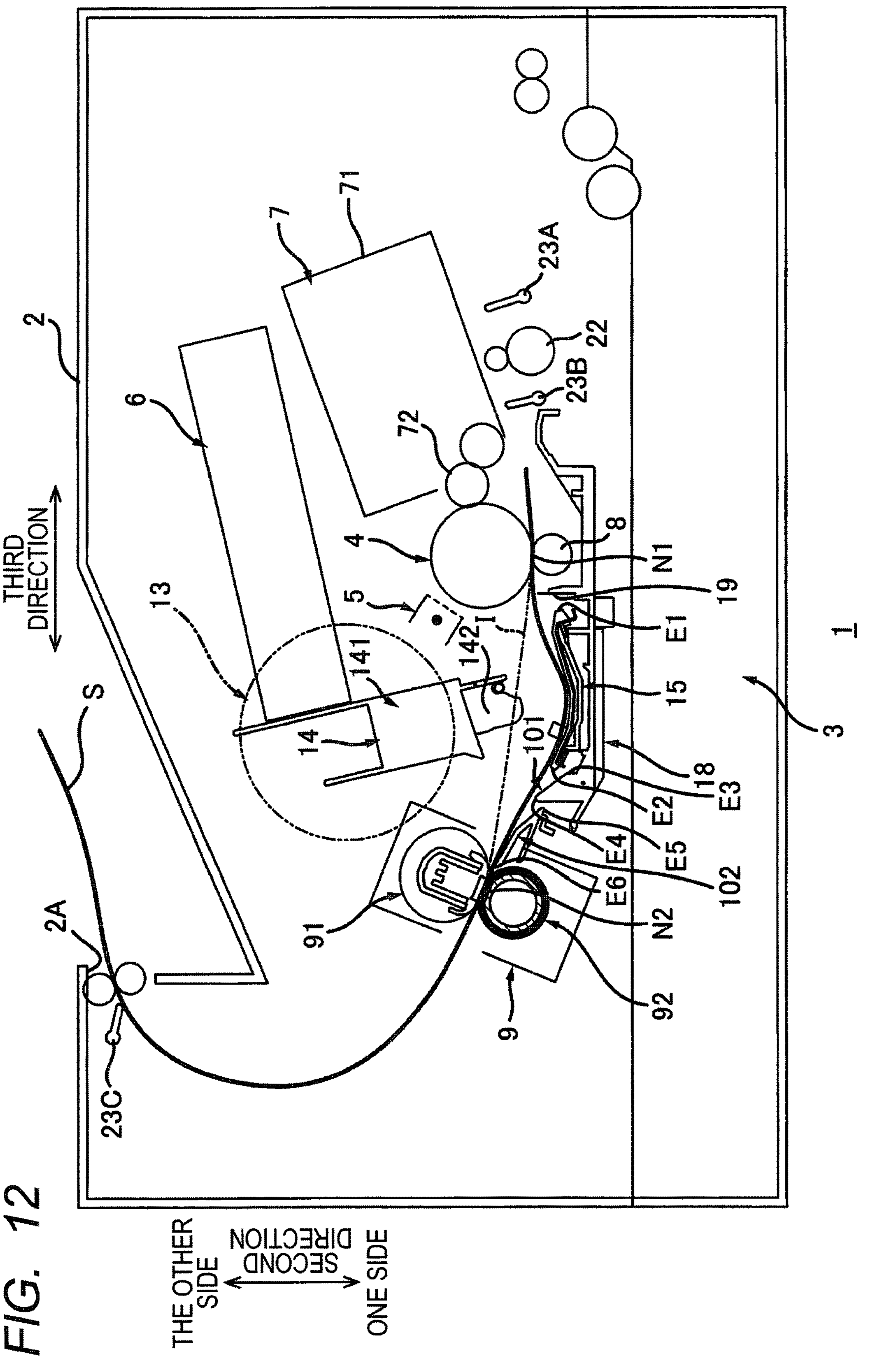
FIG. 12 is a schematic configuration diagram of an image forming apparatus.

(3) As shown in FIG. 12, in this modification, the support frame 18 includes a first guide 101. The fuser 9 includes a second guide 102 instead of the fixing guide 93 (see FIG. 1). In other words, the image forming apparatus 1 includes the first guide 101 and the second guide 102.

In a state where the chute 15 is located at the second position, the first guide 101 guides the sheet S to the fixing nip N2. In a state where the chute 15 is located at the second position, the first guide 101 is located between the chute 15 and the fixing nip N2 in the third direction. The first guide 101 extends in the third direction. The first guide 101 is inclined with respect to the imaginary plane I. The first guide 101 has a third end E3 and a fourth end E4 in the third direction. The fourth end E4 is located between the third end E3 and the fixing nip N2 in the third direction. The first guide 101 approaches the imaginary plane I from the third end E3 toward the fourth end E4 in the third direction. In a state where the chute 15 is located at the second position, the second end E2 of the chute 15 is located between the third end E3 of the first guide 101 and the fourth end E4 of the first guide 101 in the second direction. This suppresses the leading edge of the sheet S being jammed between the chute 15 and the first guide 101 when the leading edge of the sheet S is conveyed from the chute 15 to the first guide 101.

In a state where the chute 15 is located at the second position, the second guide 102 guides the sheet S to the fixing nip N2 in cooperation with the first guide 101. The second guide 102 is located between the first guide 101 and the fixing nip N2 in the third direction. The second guide 102 extends in the third direction. The second guide 102 is inclined with respect to the imaginary plane I. The second guide 102 has a fifth end E5 and a sixth end E6 in the third direction. The sixth end E6 is located between the fifth end E5 and the fixing nip N2. The second guide 102 approaches the imaginary plane I from the fifth end E5 toward the sixth end E6 in the third direction. The fourth end E4 of the first guide 101 is located between the fifth end E5 of the second guide 102 and the sixth end E6 of the second guide 102 in the second direction. This suppresses the leading edge of the sheet S being jammed between the first guide 101 and the second guide 102 when the leading edge of the sheet S is conveyed from the first guide 101 to the second guide 102.

In this modification, too, the same effects as the above-described embodiment are obtained.

(4) The development device 7 may be a development cartridge. The image forming apparatus 1 may include a drum cartridge including the photosensitive drum 4, the charger 5, and the transfer roller 8. The drum cartridge is attachable to and detachable from the main housing 2. The development cartridge is attachable to and detachable from the drum cartridge or the main housing 2.

In this case, the fuser 9 may include a shutter. The shutter opens and closes an opening 9A of the fuser 9 (see FIG. 1). The sheet S entering the fixing nip N2 passes through the opening 9A. In a state where the drum cartridge is attached to the main housing 2, the shutter opens the opening 9A. In a state where the drum cartridge is detached from the main housing 2, the shutter closes the opening 9A. This suppresses the user touching the fixing nip N2 in a state where the drum cartridge is detached from the main housing 2.

(5) The chute 15 does not need to be fixed at the first position while the controller 24 is executing the second mode. While the controller 24 is executing the second mode, the chute 15 may move from the first position toward the second position in response to contact with the sheet S.

Specifically, while the controller 24 is executing the second mode, the sheet S may bend between the transfer nip N1 and the fixing nip N2 to an extent that the chute 15 located at the first position cannot allow. Even in this case, the bending of the sheet S while the controller 24 is executing the second mode is smaller than the bending of the sheet S while the controller 24 is executing the first mode. At this time, if the pressing force of the torsion springs 17A and 17B is set to be smaller than the force with which the bent sheet S presses the chute 15 between the transfer nip N1 and the fixing nip N2, the chute 15 is pressed by the bent sheet S and moves from the first position toward the second position. With this configuration, while the controller 24 is executing the second mode, bending of the sheet S between the transfer nip N1 and the fixing nip N2 is allowed without actuating the drive source 20.

Alternatively, the chute 15 may be fixed at the first position while the controller 24 is executing the second mode.

In order to fix the chute 15 at the first position, for example, the pressing force of the torsion springs 17A and 17B is set to be sufficiently greater than the force with which the sheet S bent between the transfer nip N1 and the fixing nip N2 presses the chute 15.

If the bending of the sheet S while the controller 24 is executing the second mode is acceptable by the chute 15 located at the first position, by fixing the chute 15 at the first position by the pressing force of the torsion springs 17A and 17B, the sheet S is stably conveyed between the transfer nip N1 and the fixing nip N2.

What is claimed is:

1. An image forming apparatus comprising:

a photosensitive drum rotatable about an axis extending in a first direction;

a development device configured to supply toner to the photosensitive drum;

a transfer roller configured to transfer toner on the photosensitive drum to a sheet, the transfer roller being located on one side of the photosensitive drum in a second direction crossing the first direction, the transfer roller being configured to contact the photosensitive drum;

a fuser configured to fix toner on the sheet, the fuser including a heater configured to heat the sheet and a pressure roller configured to press the sheet;

a chute located between the transfer roller and the fuser in a third direction crossing both the first direction and the second direction, the chute causing the sheet having passed through a transfer nip to be directed toward a fixing nip, the transfer nip being a nip between the photosensitive drum and the transfer roller, the fixing nip being a nip between the heater and the pressure roller, the chute being movable in the second direction between a first position and a second position shifted from the first position toward the one side in the second direction, the chute located at the second position being farther away from an imaginary plane than the chute located at the first position, the imaginary plane passing through the transfer nip and the fixing nip;

a pressing member configured to press the chute from the second position toward the first position;

a drive source;

a reciprocating mechanism configured to reciprocate by drive force from the drive source and to press the chute to move from the first position to the second position against pressing force of the pressing member; and a controller configured to:

in response to determining that a parameter is greater than a threshold for the parameter, execute a first mode of actuating the drive source when conveying one sheet, the parameter decreasing as a conveyance speed of the sheet at the fixing nip increases, the threshold being such a value that, when the parameter is greater than the threshold, a difference between a conveyance speed of the sheet at the transfer nip and the conveyance speed of the sheet at the fixing nip is greater than a particular level; and in response to determining that the parameter is smaller than or equal to the threshold, execute a second mode of not actuating the drive source when conveying one sheet.

2. The image forming apparatus according to claim 1, wherein the controller is configured to:

when the second mode is executed, continue the second mode at least until a print job that is currently printed is completed.

3. The image forming apparatus according to claim 1, further comprising:

a main housing having a discharge port for discharging the sheet that has passed through the fuser; and a discharge sensor configured to detect the sheet that passes through the discharge port, wherein the parameter is a period of time from when the discharge sensor detects a leading edge of the sheet to when the discharge sensor detects a trailing edge of the sheet when one sheet is discharged from the discharge port.

4. The image forming apparatus according to claim 1, wherein the reciprocating mechanism is located on an other side of the chute in the second direction, the reciprocating mechanism being configured to move the chute from the first position to the second position by pressing the chute from the other side in the second direction.

5. The image forming apparatus according to claim 4, wherein the reciprocating mechanism allows the chute to move from the second position to the first position by releasing pressure on the chute.

6. The image forming apparatus according to claim 1, wherein the pressing member is a torsion spring.

7. The image forming apparatus according to claim 1, wherein the reciprocating mechanism includes:

a first member connected to the drive source and movable in the first direction;

a second member connected to the first member and rotatable about an axis extending in the third direction; and a third member connected to the second member and movable in the second direction, the third member being configured to contact the chute to move the chute.

8. The image forming apparatus according to claim 1, wherein the drive source is a solenoid.

9. The image forming apparatus according to claim 7, wherein the second member is rotatable in a first rotation direction and in a second rotation direction opposite the first rotation direction, the first rotation direction being a direction in which the chute moves from the first position to the second position, the second rotation direction being a direction in which the chute moves from the second position to the first position;

wherein the reciprocating mechanism includes a pull spring configured to pull the second member in the second rotation direction; and wherein the second member is configured to rotate in the first rotation direction against force of the pull spring by the drive force of the drive source.

10. The image forming apparatus according to claim 1, wherein, when the controller executes the first mode, the chute is configured to:

move from the first position to the second position after the sheet reaches the fuser; and move from the second position to the first position after the sheet passes through the transfer nip.

11. An image forming apparatus comprising:

a photosensitive drum rotatable about an axis extending in a first direction;

a development device configured to supply toner to the photosensitive drum;

a transfer roller configured to transfer toner on the photosensitive drum to a sheet, the transfer roller being located on one side of the photosensitive drum in a second direction crossing the first direction, the transfer roller being configured to contact the photosensitive drum;

a fuser configured to fix toner on the sheet, the fuser including a heater configured to heat the sheet and a pressure roller configured to press the sheet;

a chute located between the transfer roller and the fuser in a third direction crossing both the first direction and the second direction, the chute causing the sheet having passed through a transfer nip to be directed toward a fixing nip, the transfer nip being a nip between the photosensitive drum and the transfer roller, the fixing nip being a nip between the heater and the pressure roller, the chute being movable in the second direction between a first position and a second position shifted from the first position toward the one side in the second direction, the chute located at the second position being farther away from an imaginary plane than the chute located at the first position, the imaginary plane passing through the transfer nip and the fixing nip;

a pressing member configured to press the chute from the second position toward the first position;

a drive source;

a reciprocating mechanism configured to reciprocate by drive force from the drive source and to press the chute to move from the first position to the second position against pressing force of the pressing member; and a controller configured to:

in response to determining that a parameter is smaller than a threshold for the parameter, execute a first mode of actuating the drive source when conveying one sheet, the parameter increasing as a conveyance speed of the sheet at the fixing nip increases, the threshold being such a value that, when the parameter is smaller than the threshold, a difference between a conveyance speed of the sheet at the transfer nip and the conveyance speed of the sheet at the fixing nip is greater than a particular level; and in response to determining that the parameter is greater than or equal to the threshold, execute a second mode of not actuating the drive source when conveying one sheet.

12. The image forming apparatus according to claim 11, wherein the controller is configured to:

when the second mode is executed, continue the second mode at least until a print job that is currently printed is completed.

13. The image forming apparatus according to claim 11, wherein the parameter is a number of continuously printed pages.

14. The image forming apparatus according to claim 11, further comprising a temperature sensor configured to measure temperature of the pressure roller, wherein the parameter is a measurement value of the temperature sensor.

15. The image forming apparatus according to claim 11, wherein the reciprocating mechanism is located on an other side of the chute in the second direction, the reciprocating mechanism being configured to move the chute from the first position to the second position by pressing the chute from the other side in the second direction.

16. The image forming apparatus according to claim 15, wherein the reciprocating mechanism allows the chute to move from the second position to the first position by releasing pressure on the chute.

17. The image forming apparatus according to claim 11, wherein the pressing member is a torsion spring.

18. The image forming apparatus according to claim 11, wherein the reciprocating mechanism includes:

a first member connected to the drive source and movable in the first direction;

a second member connected to the first member and rotatable about an axis extending in the third direction; and a third member connected to the second member and movable in the second direction, the third member being configured to contact the chute to move the chute.

19. The image forming apparatus according to claim 11, wherein the drive source is a solenoid.

20. The image forming apparatus according to claim 18, wherein the second member is rotatable in a first rotation direction and in a second rotation direction opposite the first rotation direction, the first rotation direction being a direction in which the chute moves from the first position to the second position, the second rotation direction being a direction in which the chute moves from the second position to the first position;

wherein the reciprocating mechanism includes a pull spring configured to pull the second member in the second rotation direction; and wherein the second member is configured to rotate in the first rotation direction against force of the pull spring by the drive force of the drive source.

21. The image forming apparatus according to claim 11, wherein, when the controller executes the first mode, the chute is configured to:

move from the first position to the second position after the sheet reaches the fuser; and move from the second position to the first position after the sheet passes through the transfer nip.

* * * * *